United States Patent
Hwang et al.

(10) Patent No.: US 12,256,317 B2
(45) Date of Patent: Mar. 18, 2025

(54) METHOD AND DEVICE FOR MEASUREMENT IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 17/634,924

(22) PCT Filed: Aug. 14, 2020

(86) PCT No.: PCT/KR2020/010917
§ 371 (c)(1),
(2) Date: Feb. 11, 2022

(87) PCT Pub. No.: WO2021/029750
PCT Pub. Date: Feb. 18, 2021

(65) Prior Publication Data
US 2022/0279427 A1    Sep. 1, 2022

(30) Foreign Application Priority Data

Aug. 14, 2019 (KR) ................ 10-2019-0099872
Nov. 7, 2019 (KR) ................ 10-2019-0142049
Nov. 18, 2019 (KR) ................ 10-2019-0147956

(51) Int. Cl.
*H04W 48/16*    (2009.01)
*H04W 48/10*    (2009.01)
*H04W 48/20*    (2009.01)

(52) U.S. Cl.
CPC .......... *H04W 48/16* (2013.01); *H04W 48/10* (2013.01); *H04W 48/20* (2013.01)

(58) Field of Classification Search
CPC ..... H04W 48/16; H04W 48/10; H04W 48/20; H04W 48/12; H04J 11/0093
(Continued)

(56) References Cited

U.S. PATENT DOCUMENTS

2019/0215895 A1   7/2019   Huang et al.
2019/0230696 A1   7/2019   Kim et al.
(Continued)

FOREIGN PATENT DOCUMENTS

WO    2018008916 A2    1/2018

OTHER PUBLICATIONS

Written Opinion dated Nov. 25, 2020, in connection with International Application No. PCT/KR2020/010917, 8 pages.
(Continued)

*Primary Examiner* — Michael Y Mapa

(57) ABSTRACT

The disclosure relates to a method and apparatus for performing cell measurement for mobility of a user equipment (UE) in a wireless communication system, and a communication method of the UE according to an embodiment of the disclosure may include: receiving, from a base station (BS), a system information block (SIB) including first signal/physical broadcast channel (SS/PBCH) block measurement time configuration (SMTC) information and second SMTC information; determining a measurement start time based on timing offset and duration included in the first SMTC information; determining a measurement occasion based on first periodicity included in the first SMTC information and second periodicity included in the second SMTC information; and performing measurement according to the
(Continued)

measurement start time and the measurement occasion, based on the second SMTC information.

11 Claims, 27 Drawing Sheets

(58) Field of Classification Search
USPC ............... 370/312; 455/67.11, 115.1, 226.1
See application file for complete search history.

(56) References Cited

U.S. PATENT DOCUMENTS

| | | | |
|---|---|---|---|
| 2020/0374735 A1* | 11/2020 | Wei | H04L 5/0091 |
| 2021/0185710 A1 | 6/2021 | Kim et al. | |
| 2021/0329507 A1* | 10/2021 | Yao | H04W 36/0085 |
| 2022/0132348 A1* | 4/2022 | Orsino | H04W 76/27 |

OTHER PUBLICATIONS

ZTE Corporation et al., "Corrections on SMTC configuration in 38.331", Change Request, 3GPP TSG-RAN WG2 Meeting #101bis, Apr. 14, 2018, R2-1804392, 3 pages.

MediaTek Inc., "SSB based idle mode mobility configuration (38.331 RIL M031)", Change Request, 3GPP TSG-RAN WG2 NR AH 1807, Jul. 2-6, 2018, R2-1810849, 15 pages.

Intel Corporation, "SMTC configuration for idle and connected", Change Request, 3GPP TSG-RAN WG2 meeting #105, Feb. 25-Mar. 1, 2019, R2-1902221, 5 pages.

Intel Corporation, "Update on usage of Need codes", Change Request, 3GPP TSG-RAN-WG2 Meeting #106, May 13-17, 2019, R2-1908415, 323 pages.

Ericsson, "Miscellaneous non-controversial corrections Set II", Change Request, 3GPP TSG-RAN2 Meeting #106, May 13-17, 2019, R2-1908528, 481 pages.

Supplementary European Search Report dated Aug. 12, 2022 in connection with European Patent Application No. 20 85 2574, 14 pages.

International Search Report dated Nov. 25, 2020, in connection with International Application No. PCT/KR2020/010917, 4 pages.

Ericsson, "[E052] Corrections on SMTC in NR-DC," R2-1906678, 3GPP TSG-RAN2 Meeting #106, Reno, USA, May 13-17, 2019, 4 pages.

Huawei, et al., "Discussion on SMTC configuration for early measurement," R2 1907480, 3GPP TSG-RAN WG2 Meeting#106, Reno (NV), USA, May 13-17, 2019, 2 pages.

Qualcomm Incorporated, et al., "Handling of SMTC configuration," R2-1908325, 3GPP TSG-RAN WG2 Meeting #106, Reno, USA, May 13-17, 2019, 5 pages.

Samsung, "Support of SSBs for IAB Node Discovery and Measurement," R1-1906930, 3GPP TSG RAN WG1 #97, Reno, USA, May 13-17, 2019, 9 pages.

* cited by examiner

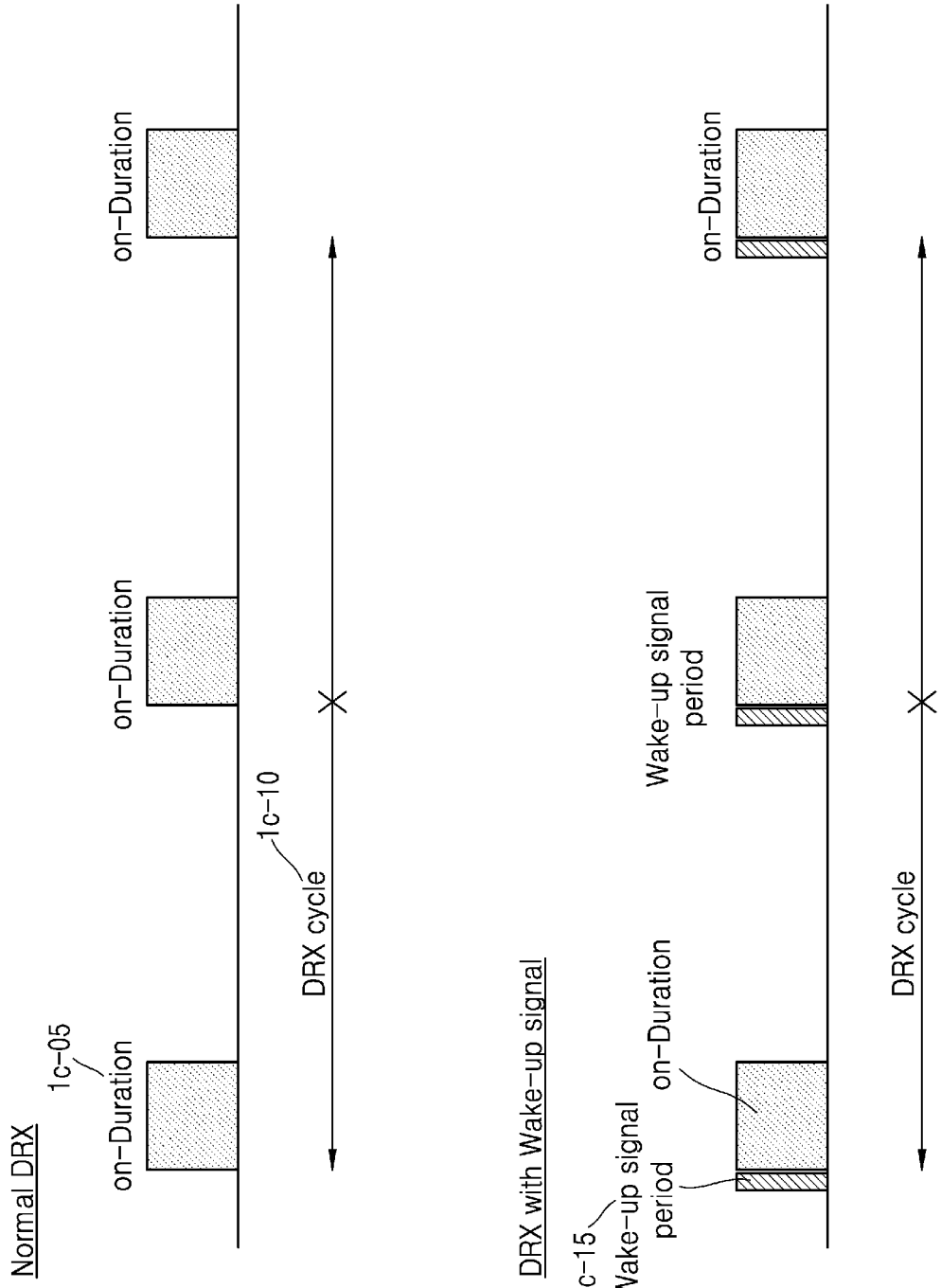

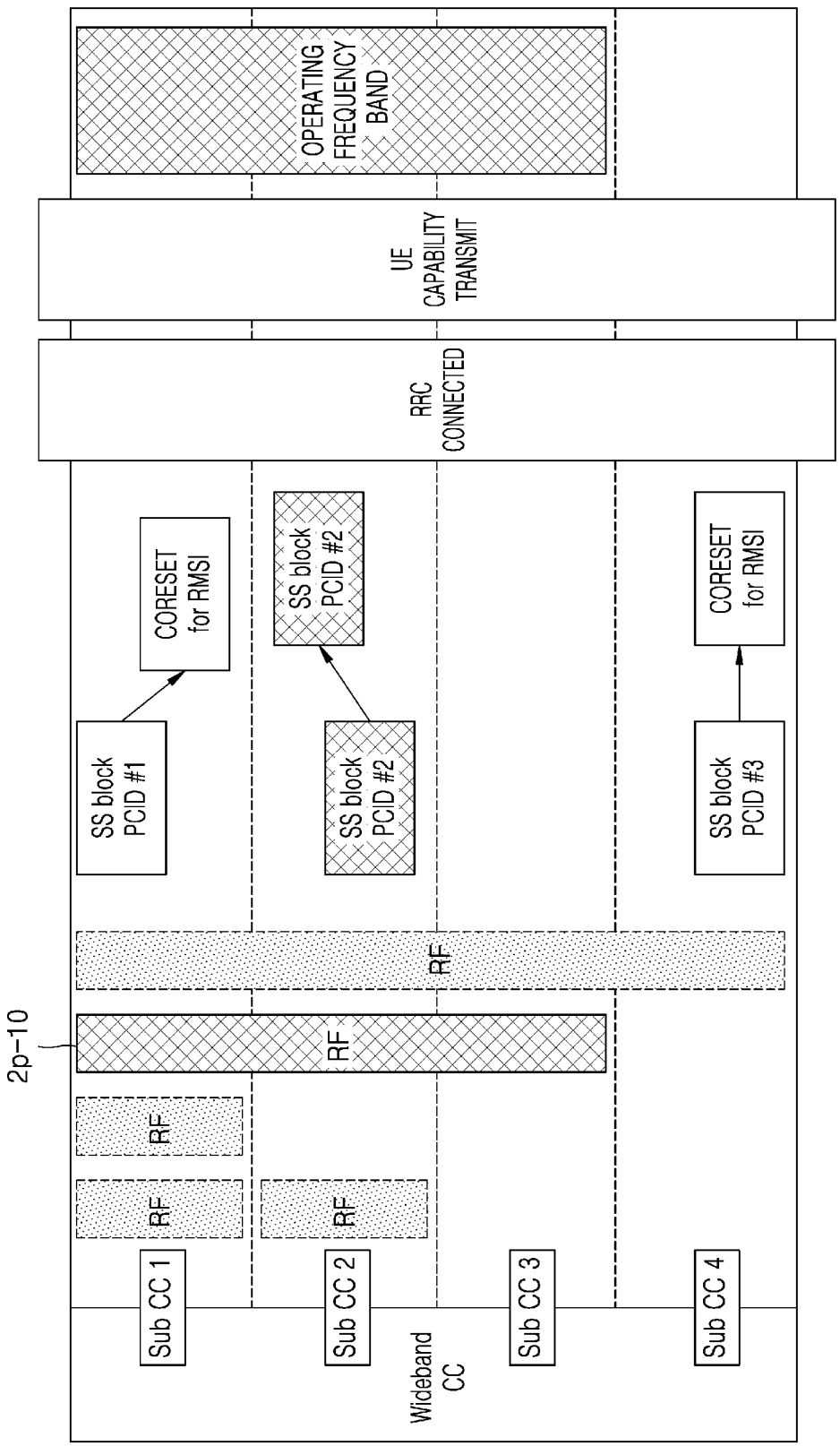

METHOD AND DEVICE FOR MEASUREMENT IN WIRELESS COMMUNICATION SYSTEM

CROSS-REFERENCE TO RELATED APPLICATIONS

This application is a 371 National Stage of International Application No. PCT/KR2020/010917, filed Aug. 14, 2020, which claims priority to Korean Patent Application No. 10-2019-0099872, filed Aug. 14, 2019, Korean Patent Application No. 10-2019-0142049, filed Nov. 7, 2019, and Korean Patent Application No. 10-2019-0147956, filed Nov. 18, 2019, the disclosures of which are herein incorporated by reference in their entirety.

BACKGROUND

1. Field

The disclosure relates to a method and apparatus for performing cell measurement for mobility of a user equipment (UE) in a wireless communication system.

Also, the disclosure relates to a wireless communication system, and more particularly, to operations of a UE and a base station (B S) which selectively monitor and transceive a wake-up signal (WUS) in a mobile communication system.

2. Description of Related Art

In order to meet increasing demand with respect to wireless data traffic after the commercialization of $4^{th}$ generation (4G) communication systems, efforts have been made to develop evolved $5^{th}$ generation (5G) system or pre-5G communication system. For this reason, 5G or pre-5G communication systems are called 'beyond 4G network' communication systems or 'post long term evolution (post-LTE)' systems. In order to achieve high data rates, implementation of 5G communication systems in an ultra-high frequency or millimeter-wave (mmWave) band (e.g., a 60 GHz band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. Also, in order to improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication technologies such as sensor networks, M2M communication, MTC, or the like are being implemented by using techniques including beamforming, MIMO, array antennas, or the like. Application of Cloud-RAN as the above-described big data processing technology may be an example of convergence of 2eG communication technology and IoT technology.

SUMMARY

The disclosure provides a method and apparatus for performing cell measurement for mobility of a user equipment (UE) in a wireless communication system.

Also, the disclosure provides a method and apparatus for monitoring a wake-up signal (WUS) in a wireless communication system. The disclosure provides a method by which, when a UE is in an active time, the UE determines whether to monitor a WUS according to a type of the active time.

Also, the disclosure provides operations of determining whether to monitor a WUS based on at least one of a discontinuous reception (DRX) type configured for a cell group including a primary cell or a DRX type configured for a cell group including a secondary cell, and monitoring a WUS.

According to an embodiment of the disclosure, a method and apparatus for performing cell measurement for mobility of a user equipment (UE) in a wireless communication system may be provided. Also, a method and apparatus for monitoring a wake-up signal (WUS) in a wireless communication system may be provided.

BRIEF DESCRIPTION OF THE DRAWINGS

FIG. 1C is a diagram for describing a wake-up signal (WUS) operation.

FIG. 2O is a diagram illustrating an example of a method of transmitting an SS/PBCH block.

FIG. 2P is a diagram illustrating a frame structure according to an embodiment of the disclosure.

DETAILED DESCRIPTION

Figure 1A:
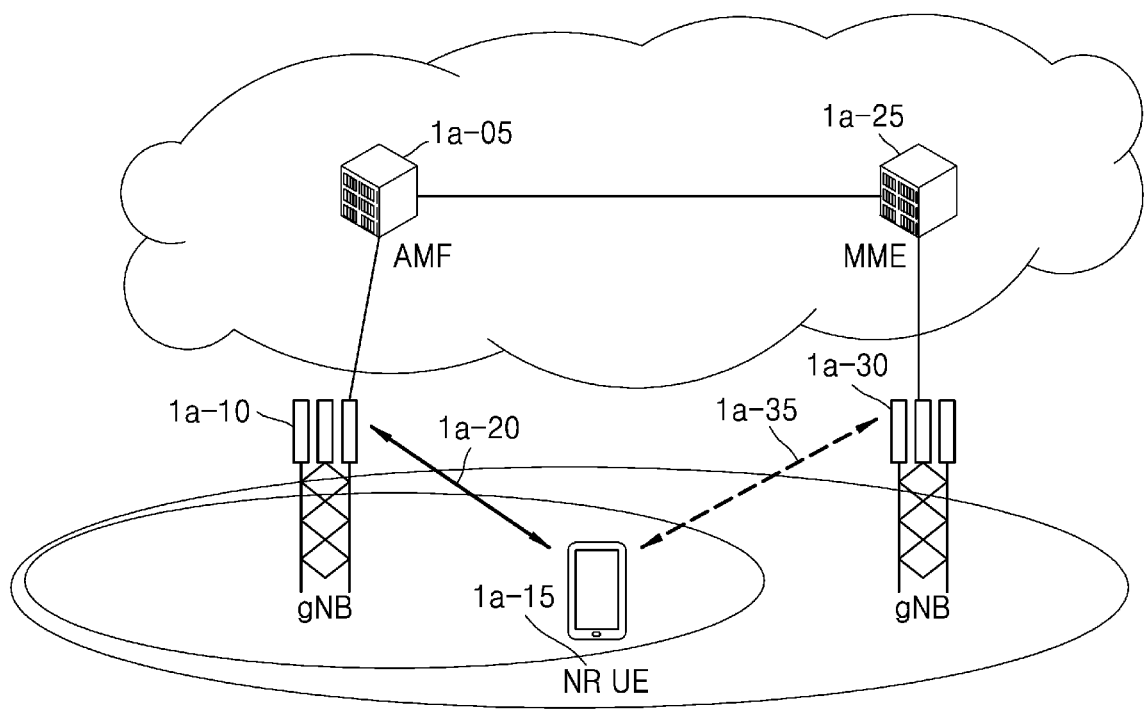
FIG. 1A is a diagram illustrating architecture of a next-generation mobile communication system.

According to an embodiment of the disclosure, a communication method of a user equipment (UE) may include: receiving, from a base station (BS), a system information block (SIB) including first signal/physical broadcast channel (SS/PBCH) block measurement time configuration (SMTC) information and second SMTC information; determining a measurement start time based on timing offset and duration included in the first SMTC information; determining a measurement occasion based on first periodicity included in the first SMTC information and second periodicity included in the second SMTC information; and performing measurement according to the measurement start time and the measurement occasion, based on the second SMTC information.

In an embodiment, the second periodicity may be greater than the first periodicity, and may be indicated as a multiple of the first periodicity.

In an embodiment, the second SMTC information may include a physical cell identification (PCI) of cells which transmit an SS/PBCH Block according to the second SMTC information.

In an embodiment, the performing of the measurement according to the measurement start time and the measurement occasion, based on the second SMTC information, may include performing measurement on the cells included in the PCI list.

In an embodiment, the communication method may further include, based on a result of the determining, performing intra-frequency cell selection or reselection or inter-frequency cell selection or reselection.

In an embodiment, each of the first SMTC information and the second SMTC information may include information indicating whether to derive an SS/PBCH block index via reference time information of a serving cell and information indicating an SS/PBCH block index value to be used in measurement.

In an embodiment, the SIB may include at least one of SIB 2 providing the second SMTC information for measurement with respect to a serving frequency and SIB 4 providing information related to a frequency for inter-frequency cell reselection and the second SMTC information for measurement with respect a frequency for the inter-frequency cell reselection.

According to an embodiment of the disclosure, a user equipment (UE) may include: a communicator: and a controller configured to control the UE to receive, from a base station (BS), a system information block (SIB) including first signal/physical broadcast channel (SS/PBCH) block measurement time configuration (SMTC) information and second SMTC information, determine a measurement start time based on timing offset and duration included in the first SMTC information, determine a measurement occasion based on first periodicity included in the first SMTC information and second periodicity included in the second SMTC information, and perform measurement according to the measurement start time and the measurement occasion, based on the second SMTC information.

In an embodiment, the second periodicity may be greater than the first periodicity, and may be indicated as a multiple of the first periodicity.

In an embodiment, the second SMTC information may include a physical cell identification (PCI) of cells which transmit an SS/PBCH Block according to the second SMTC information.

In an embodiment, the controller may be further configured to control the UE to perform measurement on the cells included in the PCI list.

In an embodiment, the controller may be further configured to control the UE to, based on a result of the determining, perform intra-frequency cell selection or reselection or inter-frequency cell selection or reselection.

In an embodiment, each of the first SMTC information and the second SMTC information may include information indicating whether to derive an SS/PBCH block index via reference time information of a serving cell and information indicating an SS/PBCH block index value to be used in measurement.

In an embodiment, the SIB may include at least one of SIB 2 providing the second SMTC information for measurement with respect to a serving frequency and SIB 4 providing information related to a frequency for inter-frequency cell reselection and the second SMTC information for measurement with respect a frequency for the inter-frequency cell reselection.

According to an embodiment of the disclosure, a control signal processing method in a wireless communication system may include: receiving a first control signal transmitted from a base station (BS); processing the received first control signal; and transmitting, to the BS, a second control signal generated based on the processing.

According to an embodiment of the disclosure, a method performed by a user equipment (UE) in a wireless communication system may include: receiving, from a base station (BS), at least one of wake-up signal (WUS) configuration information and discontinuous reception (DRX) configuration information; identifying a WUS occasion based on the WUS configuration information; when the UE is in an active time, identifying a type of the active time; and determining whether to monitor the WUS occasion based on the identified type of the active time.

In an embodiment, the method may further include, when the type of the active time is a predetermined type or a particular type, monitoring the WUS occasion, and the predetermined type or the particular type may include an active time of a case where a scheduling request is transmitted via a physical uplink control channel (PUCCH) but is pending.

In an embodiment, when the type of the active time is not the predetermined type or the particular type, the WUS occasion may not be monitored.

In an embodiment, the identifying of the type of the active time may further include: identifying a DRX cycle based on the DRX configuration information; and when the DRX cycle is not a short DRX cycle, identifying whether the UE is in an active time, based on the DRX cycle.

In an embodiment, the identifying of the type of the active time may include: identifying DRX configuration (primary DRX) with respect to a cell group including a primary cell (PCell) or a primary secondary cell (PSCell), based on the DRX configuration information; identifying a DRX cycle of the primary DRX; when the DRX cycle of the primary DRX is not a short DRX cycle, identifying whether the UE is in an active time, based on the primary DRX; and when the UE is in the active time, determining whether to perform monitoring on a WUS occasion, based on a type of the active time.

In an embodiment, the method may further include, when the type of the active time is a predetermined type or a particular type, monitoring the WUS occasion, and the predetermined type or the particular type may include an active time of a case where a scheduling request is transmitted via a physical uplink control channel (PUCCH) but is pending.

According to an embodiment of the disclosure, a user equipment (UE) in a wireless communication system may include: a transceiver; and a controller configured to receive, from a base station (BS), at least one of wake-up signal (WUS) configuration information and discontinuous reception (DRX) configuration information, identify a WUS occasion based on the WUS configuration information, when the UE is in an active time, identify a type of the active time, and determine whether to monitor the WUS occasion based on the identified type of the active time.

In an embodiment, the controller may be further configured to, when the type of the active time is a predetermined type or a particular type, monitor the WUS occasion, and the predetermined type or the particular type may include an active time of a case where a scheduling request is transmitted via a physical uplink control channel (PUCCH) but is pending.

In an embodiment, when the type of the active time is not the predetermined type or the particular type, the controller may be further configured not to monitor the WUS occasion.

In an embodiment, the controller may be further configured to: identify a DRX cycle based on the DRX configuration information; and when the DRX cycle is not a short DRX cycle, identify whether the UE is in an active time, based on the DRX cycle.

In an embodiment, the controller may be further configured to: identify DRX configuration (primary DRX) with respect to a cell group including a primary cell (PCell) or a primary secondary cell (PSCell), based on the DRX configuration information; identify a DRX cycle of the primary DRX; when the DRX cycle of the primary DRX is not a short DRX cycle, identify whether the UE is in an active time, based on the primary DRX; and when the UE is in the active time, determine whether to perform monitoring on a WUS occasion, based on a type of the active time.

In an embodiment, the controller may be further configured to, when the type of the active time is a predetermined type or a particular type, monitor the WUS occasion, and the predetermined type or the particular type may include an active time of a case where a scheduling request is transmitted via a physical uplink control channel (PUCCH) but is pending.

According to an embodiment of the disclosure, a method performed by a user equipment (UE) in a wireless communication system may include: receiving, from a base station (BS), at least one of wake-up signal (WUS) configuration information and discontinuous reception (DRX) configuration information; identifying a WUS occasion based on the WUS configuration information; when the UE is in an active time, identifying a type of the active time; and determining whether to monitor the WUS occasion based on the identified type of the active time.

According to an embodiment of the disclosure, a user equipment (UE) may include: a transceiver; and a controller configured to receive, from a base station (BS), at least one of wake-up signal (WUS) configuration information and discontinuous reception (DRX) configuration information, identify a WUS occasion based on the WUS configuration information, when the UE is in an active time, identify a type of the active time, and determine whether to monitor the WUS occasion based on the identified type of the active time.

Hereinafter, operation principles of the disclosure will be described in detail with reference to accompanying drawings. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire description of the present specification.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, according to an embodiment of the disclosure, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments of the disclosure.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of descriptions, the disclosure uses some terms and names defined in the 3rd Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of explanation. That is, a base station described by an eNB may represent a gNB. In the disclosure, the term "terminal" may refer to not only mobile phones, narrowband IoT (NB-IoT) devices, and sensors but also other wireless communication devices.

FIG. 1A is a diagram illustrating architecture of a next-generation mobile communication system.

Referring to FIG. 1A, a radio access network of the next-generation mobile communication system (e.g., a new radio (NR) system) includes a next-generation BS (e.g., a new radio node B, hereinafter, gNB) 1a-10 and a new radio core network (AMF) 1a-05. A new radio user equipment (hereinafter, NR UE or terminal) 1a-15 accesses an external network via the gNB 1a-10 and the AMF 1a-05.

In FIG. 1A, the gNB corresponds to an evolved node B (eNB) of a legacy LTE system. The gNB may be connected to the NR UE via wireless channels and may provide superior services compared to a legacy node B (1a-20). In the next-generation mobile communication system, all user traffic data may be serviced via shared channels, and therefore, an entity for performing scheduling by collating, for example, buffer state information of UEs, available transmit power state information, and channel state information may be required and the gNB 1a-10 may operate as such an entity. In general, one gNB may control a plurality of cells. The next-generation mobile communication system may have a bandwidth greater than the maximum bandwidth of the legacy LTE system so as to achieve an ultrahigh data rate, and may additionally associate a beamforming technology with orthogonal frequency division multiplexing (OFDM) as a radio access technology. Also, an adaptive modulation & coding (AMC) scheme is applied to determine a modulation scheme and a channel coding rate in accordance with a channel state of the UE.

The AMF 1a-05 performs functions such as mobility support, bearer establishment, and quality of service (QoS) configuration. The AMF is an entity for performing a mobility management function and various control functions on the UE and is connected to a plurality of BSs. Also, the next-generation mobile communication system may cooperate with the legacy LTE system, and the AMF is connected to a mobility management entity (MME) 1a-25 via a network interface. The MME is connected to an eNB 1a-30 that is a legacy BS. The UE that supports LTE-NR Dual Connectivity may transceive data while maintaining connection not only to the gNB but also to the eNB (1a-35).

Figure 1B:
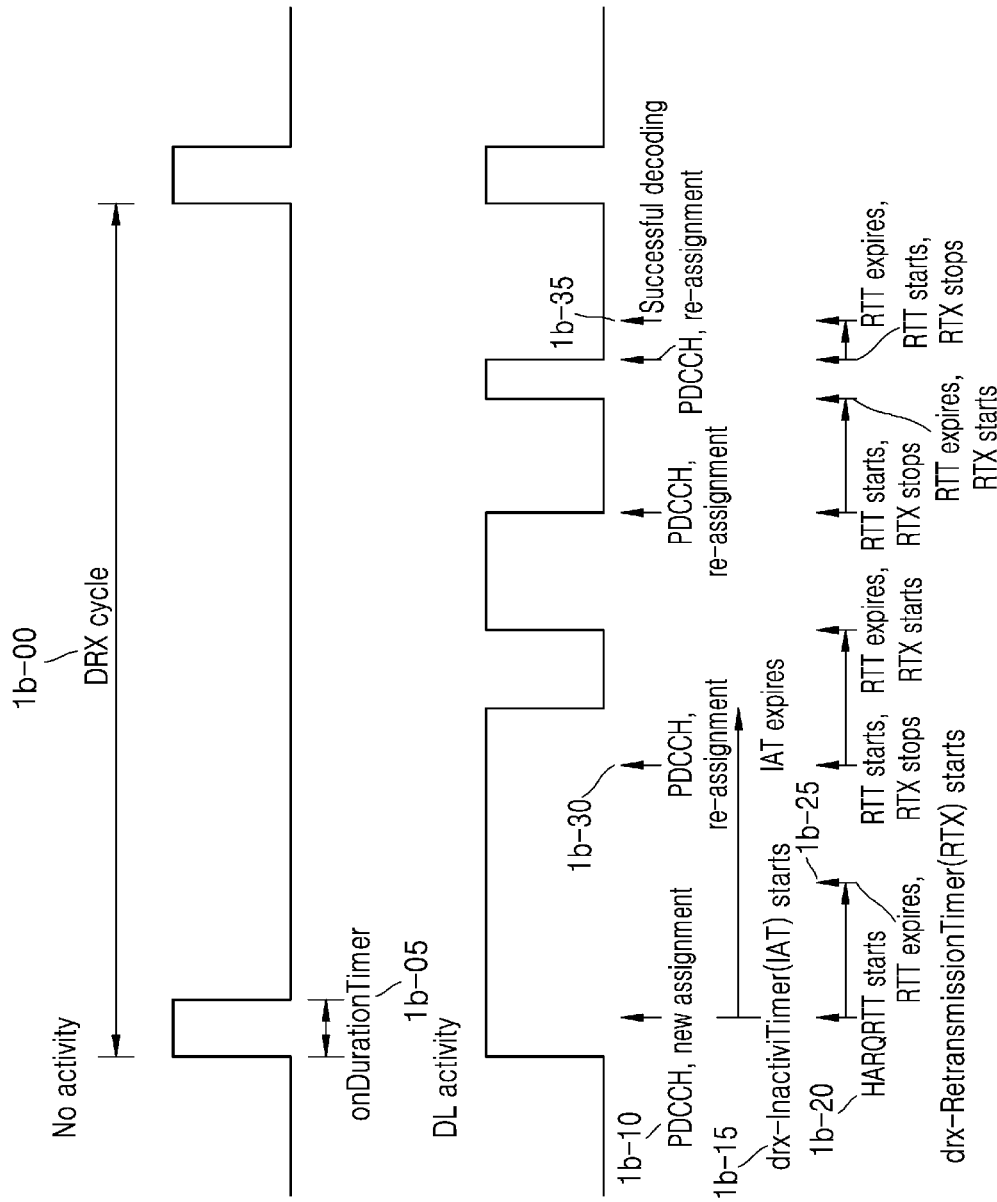
FIG. 1B is a diagram for describing a discontinuous reception (DRX) operation.

FIG. 1B is a diagram for describing a discontinuous reception (DRX) operation. DRX is applied to minimize power consumption of a UE, and to monitor only a predetermined PDCCH so as to obtain scheduling information. The DRX is operable in both an idle mode and a connected mode, and its operating method varies. The disclosure will now be described in related to the connected mode, but the scope of the disclosure is not limited thereto. If the UE continuously monitors a PDCCH so as to obtain scheduling information, this causes huge power consumption of the UE. A basic DRX operation has a DRX cycle 1b-00, and PDCCH monitoring is performed only during on-duration 1b-05. In the connected mode, the DRX cycle is configured with long DRX and short DRX. In a normal case, the long DRX cycle is applied, and when required, a BS may trigger DRX with the short DRX cycle by using a medium access control (MAC) control element (CE).

After a certain time period, the UE switches from the short DRX cycle to the long DRX cycle. Initial scheduling information of a particular UE is provided only via a predetermined PDCCH. Therefore, the UE may minimize power consumption by periodically monitoring the PDCCH.

If scheduling information about a new packet is received via a PDCCH during on-duration 1b-05 (1b-10), the UE starts a DRX inactivity timer 1b-15. The UE maintains an active state while the DRX inactivity timer is running. That is, the UE continuously performs PDCCH monitoring. Also, the UE starts a hybrid automatic repeat request (HARQ) round trip time (RTT) timer 1b-20. The HARQ RTT timer is applied to prevent the UE from unnecessarily monitoring a PDCCH during a HARQ RTT, and while during a running time of the timer, the UE does need to perform PDCCH monitoring.

However, while the DRX inactivity timer and the HARQ RTT timer are simultaneously running, the UE continuously performs PDCCH monitoring, based on the DRX inactivity timer. When the HARQ RTT timer expires, a DRX retransmission timer starts (1b-25). While the DRX retransmission timer is running, the UE has to perform PDCCH monitoring. In general, while the DRX retransmission timer is running, scheduling information for HARQ retransmission is received (1b-30). When the scheduling information is received, the UE immediately stops the DRX retransmission timer and re-starts a HARQ RTT timer. Operations above are continued until the packet is successfully received (1b-35).

A plurality of pieces of configuration information related to a DRX operation in the connected mode are delivered to the UE via an RRCConnectionReconfiguration message. The configuration information related to the DRX operation may include at least one of a plurality of pieces of information about an on-duration timer, a DRX inactivity timer, and a DRX retransmission timer, and a value of the timer is defined as the number of PDCCH subframes. After a timer starts, when subframes corresponding to a number configured as a value of the timer passes, the timer expires.

In frequency division duplex (FDD), all downlink (DL) subframes belong to a PDCCH subframe, and in time division duplex (TDD), a DL subframe and a special subframe correspond thereto. In TDD, a DL subframe, an uplink (UL) subframe, and the special subframe exist in a same frequency band. Among them, the DL subframe and the special subframe are regarded as a PDCCH subframe.

The BS may configure two states of longDRX and shortDRX. The BS may use one of the two states, in consideration of power preference indication information and UE mobility measurement information which are generally reported from the UE, and a characteristic of a configured data radio bearer (DRB). Transition to two states is performed in response to whether a particular timer expires or by transmitting a particular MAC CE to the UE.

FIG. 1C is a diagram for describing a WUS operation.

The DRX operation may be used to reduce power consumption of a UE. In addition thereto, in order to further reduce power consumption of the UE, a WUS may be used. The DRX operation involves monitoring occurrence of scheduling only during an on-Duration period 1c-05 at every configured DRX cycle 1c-10. Therefore, the UE does not need to monitor a PDCCH in all time periods so as to identify occurrence of scheduling, and may reduce power consumption in a period in which the UE does not perform monitoring.

However, as the UE monitors a PDCCH in every on-Duration, power of the UE is still consumed in a corresponding time period. In order to reduce power consumption in a corresponding time period, a method of transmitting a WUS 1c-15 in a very short time period may be used before occurrence of an on-Duration period.

The WUS indicates whether it is required for the UE to wake up in on-duration and receive a signal from the BS. Therefore, in a case where DL assignment or UL grant, a paging message, or the like with respect to the UE are to be delivered in a coming on-Duration period, the BS transmits the WUS in a preset time period before the on-Duration period. When the WUS is transmitted in the preset time period before the on-Duration period or the WUS indicates reception of a signal from the BS, the UE may wake up in the coming on-Duration period and may receive the signal from the BS.

However, when the WUS is not transmitted in the preset time period or the WUS indicates that there is no need to receive a signal from the BS, the UE may not need to wake up in the coming on-Duration period. Therefore, the UE may previously recognize, via the WUS, whether it is necessary to wake up in on-Duration, and may optimize power consumed in on-Duration.

Operations of the disclosure are described with reference to a C-DRX operation in the connected mode, but are applicable to a paging cycle operation in an idle mode. That is, during a preset short time period before a paging occasion (PO), the BS may transmit the WUS. The WUS may indicate whether a paging message is to be transmitted in the PO. For the power consumption reduction effect, a time period in which the WUS is transmitted may be shorter than a length of on-Duration or a PO.

If the WUS is applied to a carrier aggregation scheme of providing a service to a UE through two or more serving cells, power consumption of the UE may be saved. In the disclosure, proposed are UE operations performed when a WUS is received in a case where the carrier aggregation scheme is used.

In the disclosure, a WUS may be configured for a plurality of serving cells, and when one of them is detected by a UE, the UE starts an on-Duration timer. If a time period in which a WUS is received is already an active time or a coming on-Duration period is already regarded as an active time according to other conditions, an operation of detecting the WUS is not performed.

Figure 1D:
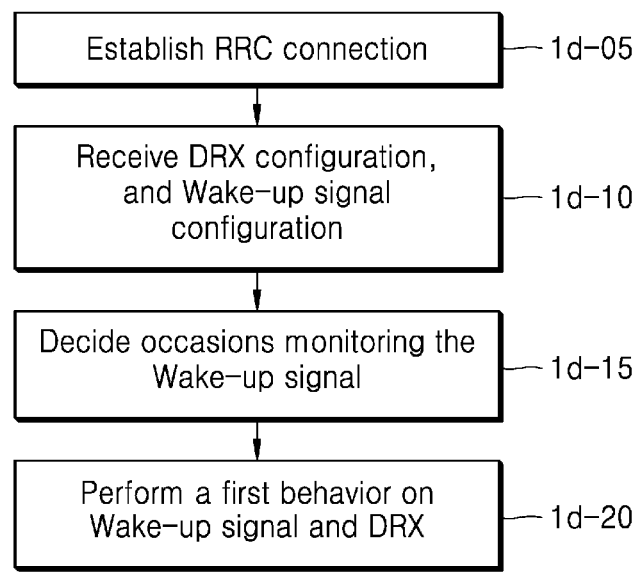
FIG. 1D is a flowchart of a user equipment (UE) for performing a wake-up operation in the disclosure.

FIG. 1D is a flowchart of a UE for performing a wake-up operation in the disclosure.

In operation 1d-05, the UE may establish RRC connection with one serving cell, i.e., a primary cell (PCell).

In operation 1d-10, the UE may receive, from a BS, at least one of DRX configuration information and WUS configuration information (information of a time and frequency on which a WUS is to be transmitted). Operation 1d-10 may be performed in a process of performing operation 1d-05, and for example, the UE may receive a message (e.g., RRCreconfiguration message or RRC setup message) for establishing RRC connection with a PCell, and the information may be included in the message.

In operation 1d-15, the UE may identify, from the configuration information, a time period (hereinafter, a WUS occasion) in which a WUS is transmittable. The WUS occasion may be implicitly determined by using DRX period and on-Duration period information in the DRX configuration information or may be explicitly indicated by the BS. For example, the WUS occasion may be configured to start on a symbol before a start point of on-Duration by a predetermined (or preset) number of symbols up to a particular time point before the on-Duration. The number of symbols may be predetermined or may be determined according to an amount of information of a WUS or may be explicitly indicated by the BS. A certain interval may exist between a WUS occasion and on-Duration. The interval corresponds to a time period in which, after the UE detects a WUS in the WUS occasion, the UE decodes the WUS and determines whether to maintain an active time in on-Duration. The interval may be predetermined or may be explicitly indicated by the BS.

In operation 1d-20, the UE may perform a WUS reception operation and a DRX operation by using the configured information. The WUS reception operation may include both an operation of receiving a WUS and an operation of not receiving a WUS, and accordingly, the DRX operation may be performed.

In detail, the disclosure proposes a method (a first operation) by which, when the UE is currently in an active time, the UE determines whether to monitor (or receive) a WUS according to a type of the active time, and monitors a WUS.

Also, the disclosure proposes a method (a second operation) by which the UE determines whether to monitor a WUS based on at least one of a type of DRX configured for a cell group including a primary cell or a type of DRX configured for a cell group including a secondary cell, and monitors a WUS. Hereinafter, operations of a first UE will now be described.

Figure 1E:
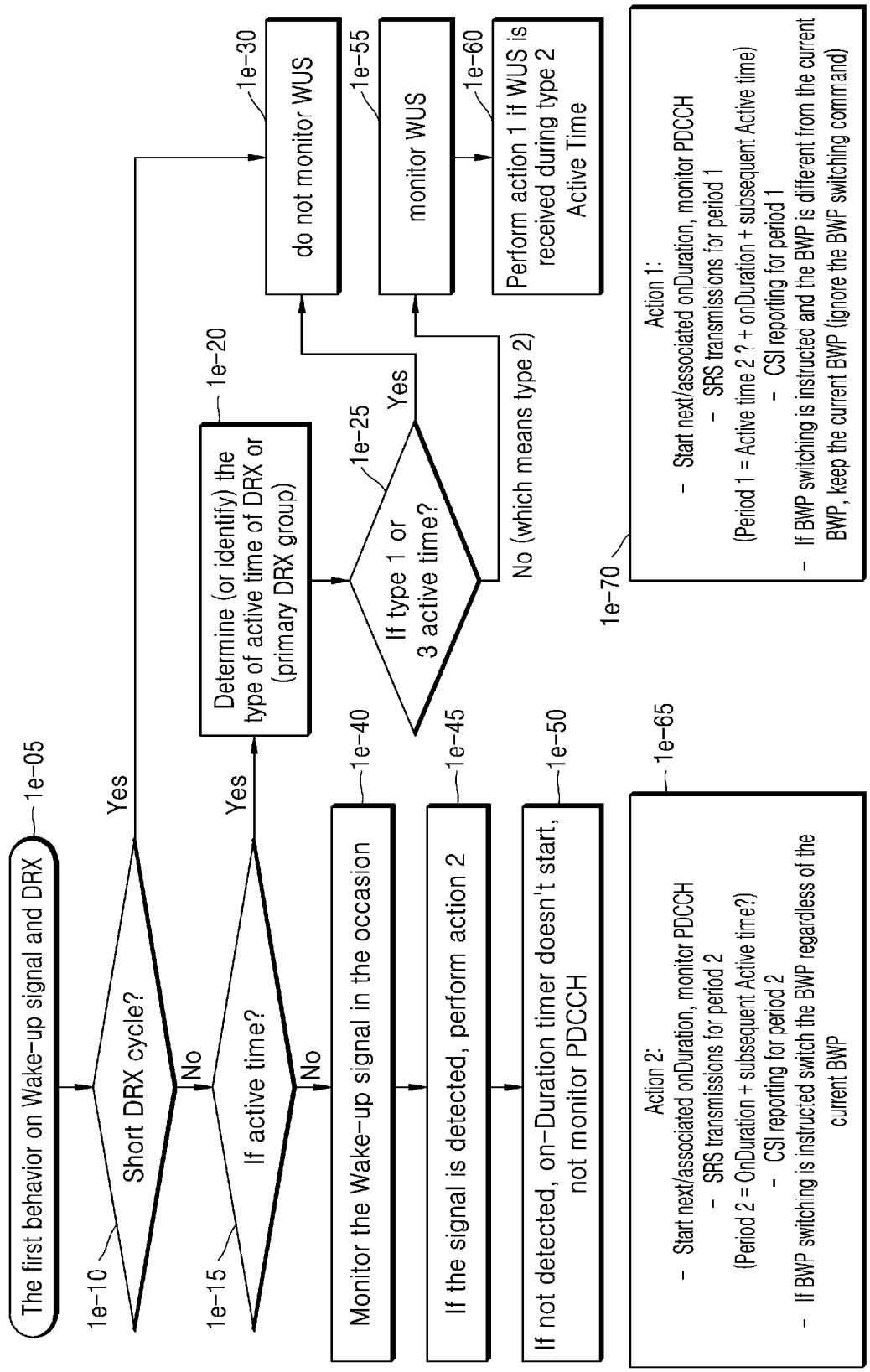
FIG. 1E is a diagram illustrating a flowchart of a first operation performed by the UE according to the disclosure.

FIG. 1E is a diagram illustrating a flowchart of the first operation performed by the UE according to the disclosure.

In operation 1e-05, the UE may perform the first operation. The first operation may include an operation of monitoring or not monitoring a WUS by determining whether an active time is an active time with a particular type or a DRX cycle is short. In the disclosure, determination on whether a DRX cycle is short or long may be identified and notified by a network or may be indicated, by the network, for the UE with an identification reference value.

In operation 1e-10, the UE may determine whether a configured DRX cycle is a short DRX cycle.

If it is the short DRX cycle, the UE may not monitor a WUS in operation 1e-30.

If the configured DRX cycle is not short or is long, in operation 1e-15, the UE determines whether the UE is currently in an active time. Here, the active time may include a time period in which the UE is defined according to an operation in an MAC. In the disclosure, three types of an active time will be described as an example, and the active time may be defined as below. However, embodiments of the disclosure are not limited thereto, and an additional active time may be defined:
  type 1: drx-onDurationTimer or drx-InactivityTimer or drx-RetransmissionTimerDL or drx-Retransmission-TimerUL or ra-ContentionResolutionTimer is running (5.1.5 of 38.321 MAC specification); or
  type 2: a Scheduling Request is sent on PUCCH and is pending (5.4.4 of 38.321 MAC specification); or
  type 3: a PDCCH indicating a new transmission addressed to the C-RNTI of the MAC entity has not been received after successful reception of a Random Access Response for the Random Access Preamble not selected by the MAC entity among the contention-based Random Access Preamble (5.1.4 of 38.321 MAC specification).

When a current time is an active time, the UE may identify a type of the active time in operation 1e-20. Afterward, the UE may identify whether the identified type of the active time is a preset type or a particular type (e.g., type 2 in the disclosure) (operation 1e-25). That is, the UE may identify whether the active time is an active time of a case where a scheduling request is transmitted via a physical uplink control channel (PUCCH) but is pending.

If a type of the active time is not the preset type or the particular type (e.g., type 1 or type 3), the UE may not monitor a WUS in a WUS occasion (operation 1e-30).

If a type of the active time is the preset type or the particular type (e.g., type 2), the UE may monitor a WUS in the WUS occasion (operation 1e-55). Therefore, as a result of the monitoring, if the WUS is received during the active time, the UE may include an operation below (referred to as Action 1 in the disclosure) (operation 1e-60).

Action 1 may include at least one of operations below (operation 1e-70).
Action 1:
  Start next/associated onDuration,
  monitor PDCCH during onDuration,
  SRS transmissions for period 1

(Period 1=Active time of type 2+onDuration+subsequent Active time)

CSI reporting for period 1
  If BWP switching is instructed and the BWP is different from the current BWP, keep the current BWP (ignore the BWP switching command)

In operation 1e-15, if the current time is not the active time, the UE may monitor a WUS in the WUS occasion (operation 1e-40).

In operation 1e-40, if the WUS is received, the UE performs Action 2 (operation 1e-45).

Action 2 may include at least one of operations below (operation 1e-65).
Action 2:
  Start next/associated onDuration,
  monitor PDCCH during onDuration
  SRS transmissions for period 2

(Period 2=onDuration+subsequent Active time)

CSI reporting for period 2
  If BWP switching is instructed switch the BWP regardless of the current BWP In operation 1e-40, if the WUS is not received, the UE does not start an on-Duration timer and does not monitor a PDCCH.

Figure 1F:
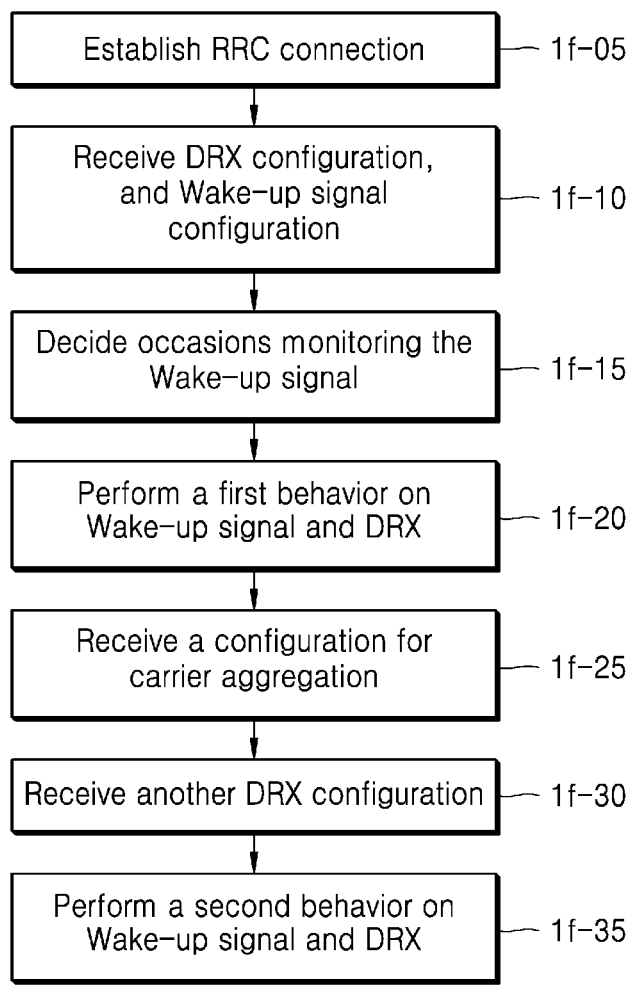
FIG. 1F is a diagram illustrating a flowchart of multi-DRX configuration for carrier aggregation in the disclosure.

FIG. 1F is a diagram illustrating a flowchart of multi-DRX configuration for carrier aggregation in the disclosure.

In operation 1f-05, a UE may establish RRC connection with at least one serving cell.

In operation 1f-10, the UE may receive, from a BS, at least one of DRX configuration information and WUS configuration information (information of a time and frequency on which a WUS is to be transmitted). In the disclosure, the DRX configuration information received in operation 1*f*-10 may be referred to as first DRX configuration information. Operation 1*f*-10 may be performed in a process of performing operation 1*f*-05, and for example, the UE may receive a message (e.g., RRCreconfiguration message or RRC setup message) for establishing RRC connection with a PCell, and the information may be included in the message.

In operation 1*f*-15, the UE may identify, from the configuration information, a time period (hereinafter, a WUS occasion) in which a WUS is transmittable. The WUS occasion may be implicitly determined by using DRX period and on-Duration period information in the DRX configuration information or may be explicitly indicated by the BS. For example, the WUS occasion may be configured to start on a symbol before a start point of on-Duration by a predetermined (or preset) number of symbols up to a particular time point before the on-Duration. The symbol may be predetermined as described above or may be determined according to an amount of information of a WUS or may be explicitly indicated by the BS. A certain interval may exist between a WUS occasion and on-Duration. The interval corresponds to a time period in which, after the UE detects a WUS in the WUS occasion, the UE decodes the WUS and determines whether to maintain an active time in on-Duration. The interval may be predetermined or may be explicitly indicated by the BS.

In operation 1*f*-20, the UE performs a first UE operation related to a DRX operation and a WUS operation in the cell. The first UE operation is equal to what is described with reference to FIG. 1E and detailed descriptions thereof are omitted.

In operation 1*f*-25, the UE receives carrier aggregation configuration information.

In operation 1*f*-30, the UE may receive configuration information of other DRX (referred to as second DRX configuration information in the disclosure), in addition to DRX received in operation 1*f*-10. However, the second DRX configuration information may be included in the carrier aggregation configuration information. Also, the BS may notify, to the UE, whether the received second DRX configuration information is to be applied to a set of some Scells or a combination of a special cell (spcell) and Scells.

In operation 1*f*-35, the UE may perform a DRX operation to which two DRX configurations (e.g., configurations according to the first DRX configuration information and the second DRX configuration information) are applied. Also, the UE may perform a second operation related to WUS monitoring.

Figure 1G:
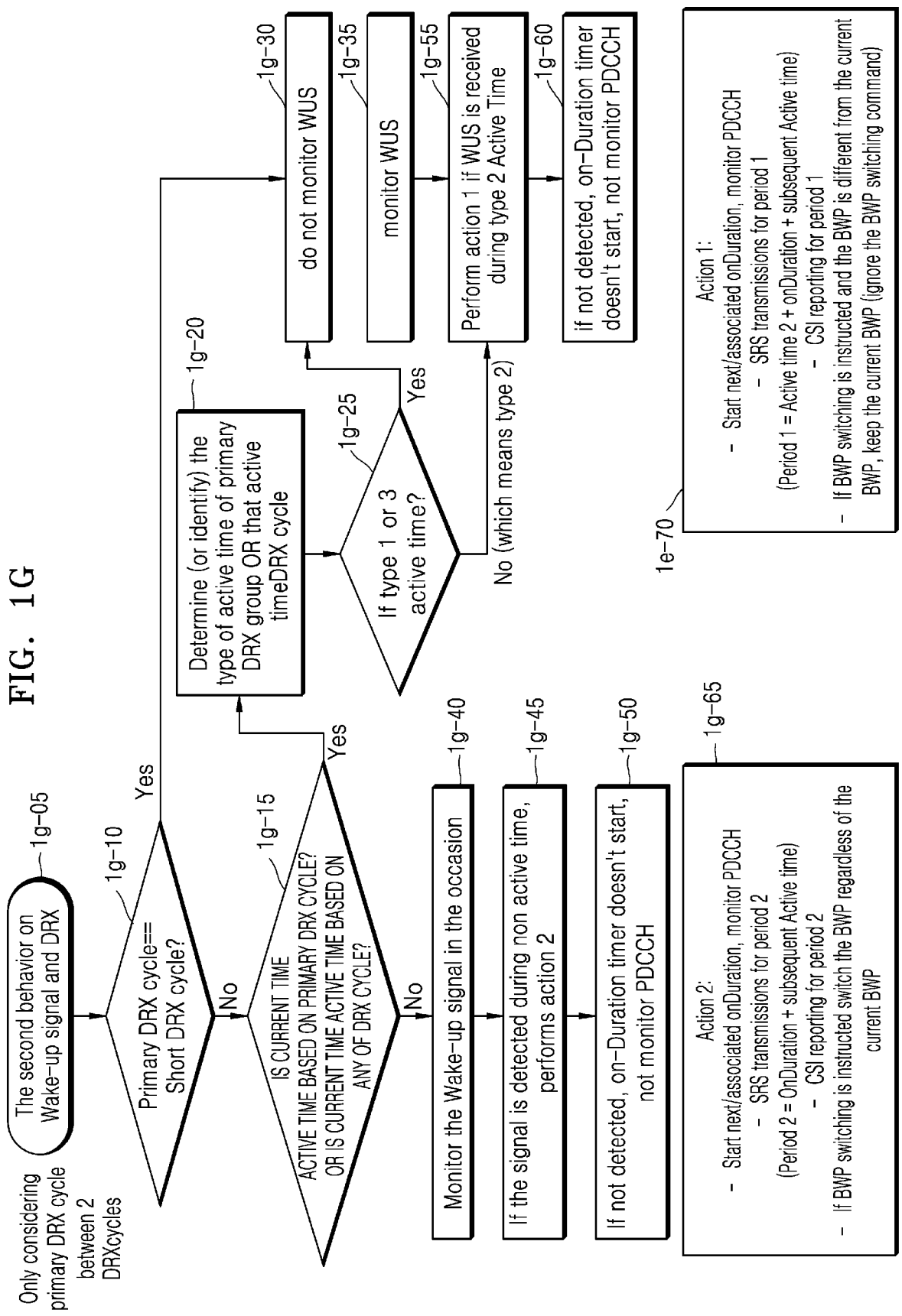
FIG. 1G is a diagram illustrating a flowchart of a case in which only primary DRX of a second operation performed by a UE is considered according to the disclosure.

FIG. 1G is a diagram illustrating a flowchart of a case in which only primary DRX of a second operation performed by a UE is considered according to the disclosure.

Referring to FIG. 1G, the primary DRX may include DRX configuration used for a set of cells including a Pcell or a pscell, from among a plurality of DRX configurations configured for the UE. Also, DRX configuration used for a set of cells to include other scells may be defined as secondary DRX.

In another embodiment, a network may notify primary DRX for DRX configuration to be used by a set of particular cells regardless of a particular spcell and a scell, and secondary DRX for DRX to be used by other cells.

In operation 1*g*-05, the UE may perform a second operation. When based on primary DRX, the second operation may include an operation of monitoring a WUS by determining whether a current time is an active time with a particular type among an active time or whether a primary DRX cycle is a short cycle. In the disclosure, determination on whether a DRX cycle is short or long may be identified and notified by the network or may be indicated, by the network, for the UE with an identification reference value.

In operation 1*g*-10, the UE may determine whether the configured primary DRX cycle is a short DRX cycle.

If it is the short DRX cycle, the UE may not monitor a WUS in operation 1*g*-30.

If the configured DRX cycle is not short or is long, in operation 1*g*-15, the UE may identify whether the current time is an active time, based on the primary DRX cycle. Here, the active time may include a time period in which the UE is defined according to an operation in an MAC and primary DRX.

In another embodiment, in operation 1*g*-15, the UE may identify whether the current time is an active time, based on at least one DRX, regardless of which DRX is concerned among at least two configured DRX cycles.

In the disclosure, three types of an active time will be described as an example, and the active time may be defined as below. However, embodiments of the disclosure are not limited thereto, and an additional active time may be defined.

- type 1: (based on primary DRX configuration) drx-onDurationTimer or drx-InactivityTimer or drx-RetransmissionTimerDL or drx-RetransmissionTimerUL or (based on MAC) ra-ContentionResolutionTimer is running (5.1.5 of 38.321 MAC specification); or
- type 2: (based on MAC) a Scheduling Request is sent on PUCCH and is pending (5.4.4 of 38.321 MAC specification); or
- type 3: a PDCCH indicating a new transmission addressed to the C-RNTI of the MAC entity has not been received after successful reception of a Random Access Response for the Random Access Preamble not selected by the MAC entity among the contention-based Random Access Preamble (5.1.4 of 38.321 MAC specification).

In operation 1*g*-15, based on primary DRX, or at least one DRX among at least two DRXs, when the current time is an active time, the UE may identify a type of the active time in operation 1*g*-20. Afterward, the UE may identify whether the type of the active time is a preset type or a particular type (e.g., type 2 in the disclosure) (operation 1*g*-25).

If a type of the active time is not the preset type or the particular type (e.g., type 1 or type 3), the UE may not monitor a WUS in a WUS occasion (operation 1*g*-30).

If a type of the active time is the preset type or the particular type (e.g., type 2), the UE may monitor a WUS in the WUS occasion (operation 1*g*-35). Therefore, as a result of the monitoring, if the WUS is received during the active time, the UE may perform action 1 below (operation 1*g*-60).

Action 1 may include at least one of operations below (operation 1*g*-70).

Action 1:
Start next/associated onDuration,
monitor PDCCH during onDuration,
SRS transmissions for period 1

(Period 1=Active time of type 2+onDuration+subsequent Active time)

CSI reporting for period 1
If BWP switching is instructed and the BWP is different from the current BWP, keep the current BWP (ignore the BWP switching command)

In operation 1g-15, if the current time is not an active time, the UE may monitor a WUS in the WUS occasion (operation 1g-40).

In operation 1g-40, if the WUS is received, the UE performs Action 2 (operation 1g-45).

Action 2 may include at least one of operations below (operation 1g-65).

Action 2:
Start next/associated onDuration,
monitor PDCCH during onDuration
SRS transmissions for period 2

(Period 2=onDuration+subsequent Active time)

CSI reporting for period 2
If BWP switching is instructed switch the BWP regardless of the current BWP In operation 1g-40, if the WUS is not received, the UE does not start an on-Duration timer and does not monitor a PDCCH.

In operations 1g-40 or 1g-35, the UE may monitor a WUS in the WUS occasion on a particular serving cell or all activated serving cells. If the BS configured that a WUS is to be transmitted only on a particular serving cell such as PCell, the UE may monitor the WUS in a WUS occasion only on the serving cell. Otherwise, if the BS configured that a WUS is to be transmitted on all activated serving cells, the UE may monitor the WUS in same WUS occasion periods on all activated serving cells. When a WUS is detected in at least one WUS occasion from the particular serving cell or from among all activated serving cells, the UE transitions to an active time in a coming on-Duration period after the WUS occasion in all serving cells, and starts an on-Duration timer.

Figure 1H:
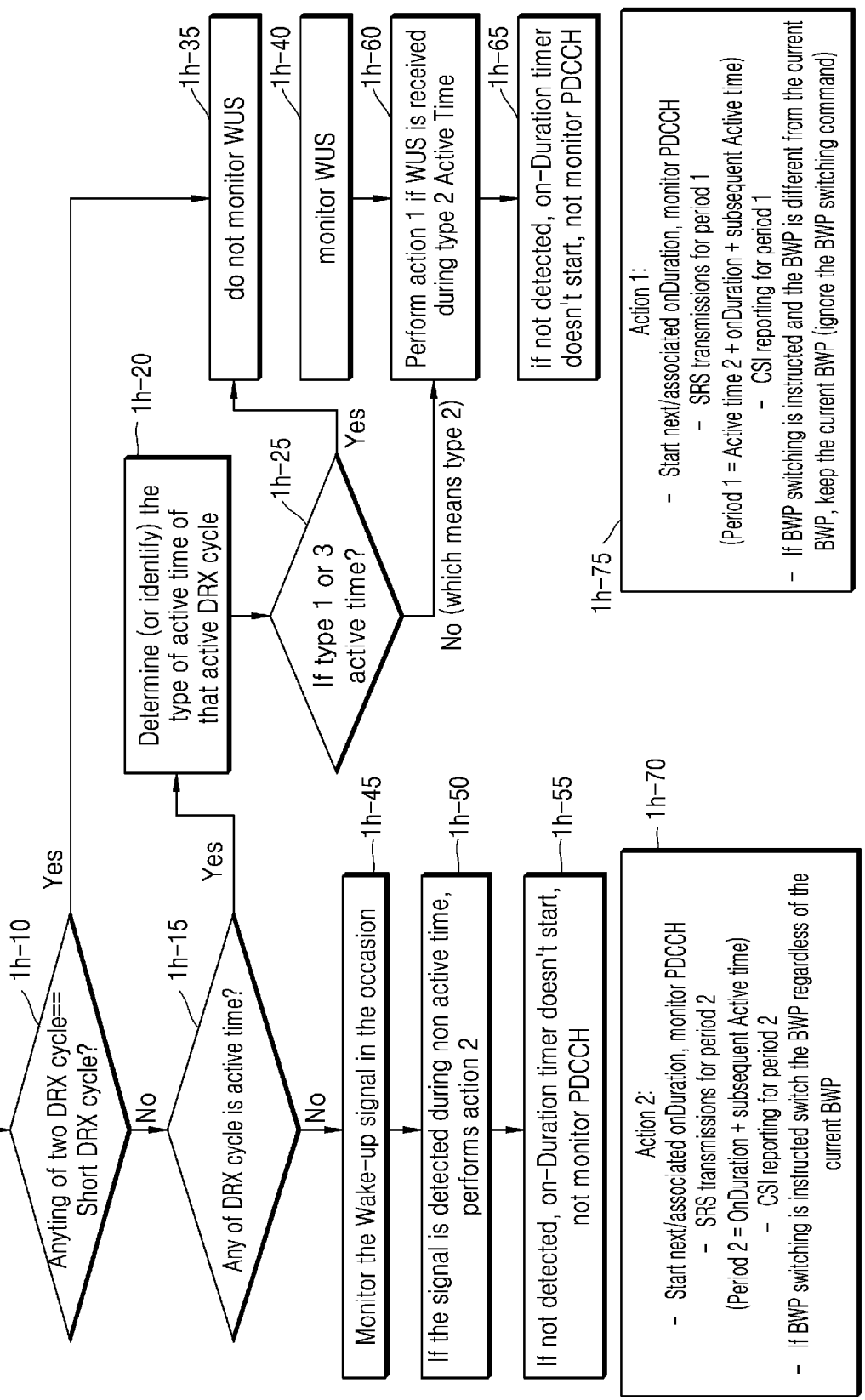
FIG. 1H is a diagram illustrating a flowchart of a case in which two DRXs of a second operation performed by a UE are all considered according to the disclosure.

FIG. 1H is a diagram illustrating a flowchart of a case in which two DRXs of a second operation performed by a UE are all considered according to the disclosure.

Referring to FIG. 1H, the primary DRX may include DRX configuration used for a set of cells including a Pcell or a pscell, from among a plurality of DRX configurations configured for the UE. Also, DRX configuration used for a set of cells to include other scells may be defined as secondary DRX.

In another embodiment, a network may notify primary DRX for DRX configuration to be used by a set of particular cells regardless of a particular spcell and a scell, and secondary DRX for DRX to be used by other cells.

In operation 1h-05, the UE may perform a second operation. When based on two DRXs, the second operation may involve determining whether a current time is an active time with a particular type, or determining or not determining a WUS by determining whether two DRX cycles are a short DRX cycle. In the disclosure, determination on whether a DRX cycle is short or long may be identified and notified by the network or may be indicated, by the network, for the UE with an identification reference value.

In operation 1h-10, the UE may determine whether any one of the configured two DRX cycles is a short DRX cycle.

If it is the short DRX cycle, in operation 1h-30, the UE does not monitor a WUS.

If any one of the configured DRX cycles is not short or all of them are long, in operation 1h-15, the UE may identify whether the current time is an active time based on at least one DRX, by performing determination based on each of the two (primary and secondary) DRX cycles.

In the disclosure, three types of an active time will be described as an example, and the active time may be defined as below. However, embodiments of the disclosure are not limited thereto, and an additional active time may be defined.

type 1: (based on primary or secondary DRX configuration) drx-onDurationTimer or drx-InactivityTimer or drx-RetransmissionTimerDL or drx-RetransmissionTimerUL or (based on MAC) ra-ContentionResolutionTimer is running (5.1.5 of 38.321 MAC specification); or type 2: (based on MAC) a Scheduling Request is sent on PUCCH and is pending (5.4.4 of 38.321 MAC specification); or type 3: a PDCCH indicating a new transmission addressed to the C-RNTI of the MAC entity has not been received after successful reception of a Random Access Response for the Random Access Preamble not selected by the MAC entity among the contention-based Random Access Preamble (5.1.4 of 38.321 MAC specification).

When a current time is an active time in operation 1h-15, the UE may identify a type of the active time of the current time in operation 1h-20. Afterward, the UE may additionally identify whether the type of the active time is a preset type or a particular type (e.g., type 2 in the disclosure) (operation 1h-25).

If a type of the active time is not the preset type or the particular type (e.g., type 1 or type 3), the UE may not monitor a WUS in a WUS occasion (operation 1h-30).

If a type of the active time is the preset type or the particular type (e.g., type 2), the UE may monitor a WUS in the WUS occasion (operation 1h-35). Therefore, as a result of the monitoring, if the WUS is received during the active time, the UE may perform action 1 below (operation 1h-60).

Action 1 may include at least one of operations below (operation 1h-70).

Action 1:
Start next/associated onDuration,
monitor PDCCH during onDuration,
SRS transmissions for period 1

(Period 1=Active time of type 2+onDuration+subsequent Active time)

CSI reporting for period 1
If BWP switching is instructed and the BWP is different from the current BWP, keep the current BWP (ignore the BWP switching command)

In operation 1h-15, if the current time is not the active time even based on two DRXs, the UE may monitor a WUS in the WUS occasion (operation 1h-40).

In operation 1h-40, if the WUS is received, the UE performs Action 2 (operation 1h-45).

Action 2 may include at least one of operations below (operation 1h-65).

Action 2:
Start next/associated onDuration,
monitor PDCCH during onDuration
SRS transmissions for period 2

(Period 2=onDuration+subsequent Active time)

CSI reporting for period 2
If BWP switching is instructed switch the BWP regardless of the current BWP In operation 1h-45, if the WUS is not received, the UE does not start an on-Duration timer and does not monitor a PDCCH.

In operations 1h-45 or 1h-40, the UE may monitor a WUS in the WUS occasion on a particular serving cell or all activated serving cells. If the BS configured that a WUS is to be transmitted only on a particular serving cell such as PCell, the UE may monitor the WUS in a WUS occasion only on the serving cell. Otherwise, if the BS configured that a WUS is to be transmitted on all activated serving cells, the UE may monitor the WUS in same WUS occasion periods on all activated serving cells. When a WUS is detected in at least one WUS occasion from the particular serving cell or from among all activated serving cells, the UE transitions to an active time in a coming on-Duration period after the WUS occasion in all serving cells, and starts an on-Duration timer.

Figure 1I:
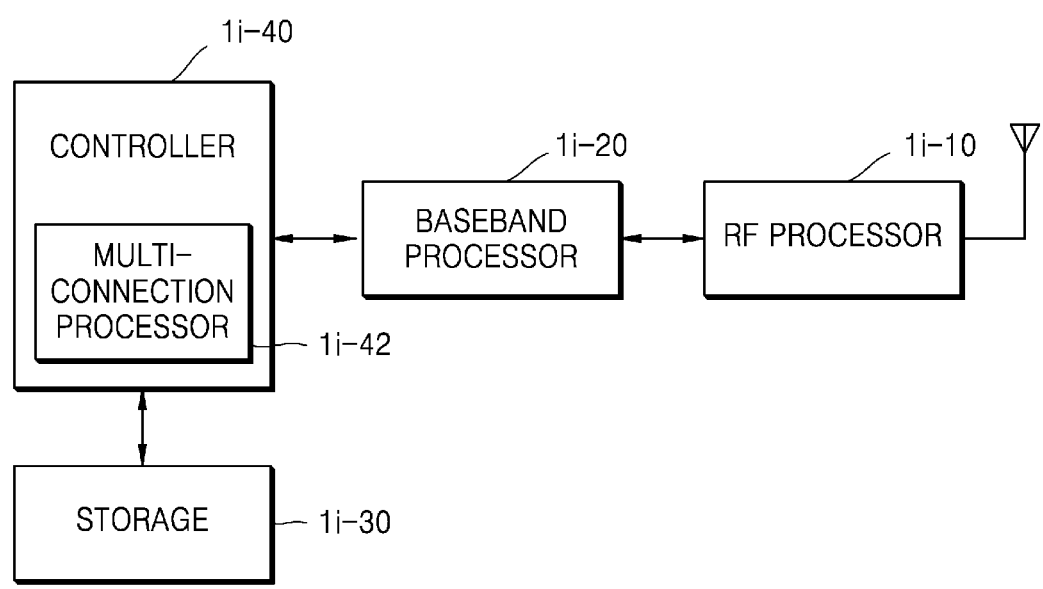
FIG. 1I is a diagram illustrating an internal structure of a UE to which the disclosure is applied.

FIG. 1I is a diagram illustrating a structure of a UE according to the disclosure.

Referring to drawing, the UE includes a radio frequency (RF) processor 1i-10, a baseband processor 1i-20, a storage 1i-30, and a controller 1i-40.

The RF processor 1i-10 performs functions for transmitting and receiving signals through radio channels, e.g., band conversion and amplification of the signals. That is, the RF processor 1i-10 may up-convert a baseband signal provided from the baseband processor 1i-20, into an RF band signal and then may transmit the RF band signal through an antenna, and may down-convert an RF band signal received through the antenna, into a baseband signal. For example, the RF processor 1i-10 may include a transmit filter, a receive filter, an amplifier, a mixer, an oscillator, a digital-to-analog convertor (DAC), an analog-to-digital convertor (ADC), or the like. Although only one antenna is illustrated in drawing, the UE may include a plurality of antennas. Also, the RF processor 1i-10 may include a plurality of RF chains. In addition, the RF processor 1i-10 may perform beamforming. For beamforming, the RF processor 1i-10 may adjust phases and intensities of signals to be transmitted or received through a plurality of antennas or antenna elements. Also, the RF processor may perform a multiple-input and multiple-output (MIMO) operation and may receive a plurality of layers in the MIMO operation.

The baseband processor 1i-20 converts between a baseband signal and a bit string according to physical layer specifications of a system. For example, for data transmission, the baseband processor 1i-20 may generate complex symbols by encoding and modulating a transmit bit string. For data reception, the baseband processor 1i-20 may reconstruct a received bit string by demodulating and decoding a baseband signal provided from the RF processor 1i-10. For example, according to an OFDM scheme, for data transmission, the baseband processor 1i-20 may generate complex symbols by encoding and modulating a transmit bit string, may map the complex symbols to subcarriers, and then may configure OFDM symbols by performing inverse fast Fourier transform (IFFT) and cyclic prefix (CP) insertion. For data reception, the baseband processor 1i-20 may segment a baseband signal provided from the RF processor 1i-10, into OFDM symbol units, may reconstruct signals mapped to subcarriers by performing fast Fourier transform (FFT), and then may reconstruct a received bit string by demodulating and decoding the signals.

The baseband processor 1i-20 and the RF processor 1i-10 transmit and receive signals as described above. Accordingly, the baseband processor 1i-20 and the RF processor 1i-10 may also be called a transmitter, a receiver, a transceiver, or a communicator. Furthermore, at least one of the baseband processor 1i-20 and the RF processor 1i-10 may include a plurality of communication modules to support a plurality of different radio access technologies. At least one of the baseband processor 1i-20 and the RF processor 1i-10 may include different communication modules to process signals of different frequency bands. For example, the different radio access technologies may include a wireless LAN (for example: IEEE 802.11), a cellular network (for example: LTE), or the like. The different frequency bands may include a SHF (e.g., 2.NRHz, NRhz) band and an mmWave (e.g., 60 GHz) band.

The storage 1i-30 stores basic programs, application programs, and data, e.g., configuration information, for operations of the UE. In particular, the storage 1i-30 may store information about a second access node that performs wireless communication by using a second radio access technology. The storage 1i-30 provides the stored data upon request by the controller 1i-40.

The controller 1i-40 controls overall operations of the UE. For example, the controller 1i-40 transmits and receives signals via the baseband processor 1i-20 and the RF processor 1i-10. Also, the controller 1i-40 records and reads data on or from the storage 1i-40. To this end, the controller 1i-40 may include at least one processor. For example, the controller 1i-40 may include a communication processor (CP) for controlling communications and an application processor (AP) for controlling an upper layer such as an application program.

As another embodiment, in the disclosure, UE operations below may be considered.

1: The UE may receive RRCReconfiguration, and may obtain at least one from among a plurality of pieces of information below.

DRX configuration 1, DRX configuration 2
■ Timer, offset etc
WUS/Power Saving Signal configuration
■ time/frequency information 2: The UE may perform WUS monitoring based on the configuration information.

3: If a WUS is received, the UE may monitor a PDCCH during on-duration. (PDCCH monitoring during onDuration if WUS is received)

4: The UE may determine whether to monitor a WUS during an active time with respect to a primary DRX (During Active Time of primary DRX group, determine whether to monitor WUS or not)

If an active time is of type 1 or type 3, the UE may not monitor a WUS (If type 1 or type 3 Active Time, do not monitor WUS)

If an active time is of type 2, the UE may not monitor a WUS (If type 2 Active Time, monitor WUS)

■ If a WUS is received during the active time of type 2, action 1 may be performed (Perform action 1 if WUS is received during type 2 Active Time)

5: The UE may determine whether to monitor a WUS during a non-active time with respect to a primary DRX (During non-Active Time of primary DRX group, determine whether to monitor WUS or not)

If condition 1 is met, do not monitor WUS
If condition 2 is met, monitor WUS
■ Perform action 2 if WUS is received during non-Active Time A type of an active time may be classified into types below.

Type 1: drx-onDurationTimer or drx-InactivityTimer or drx-RetransmissionTimerDL or drx-RetransmissionTimerUL or ra-ContentionResolutionTimer (as described in clause 5.1.5) is running; or Type 2: a Scheduling Request is sent on PUCCH and is pending (as described in clause 5.4.4); or Type 3: a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

In operation 5, condition 1 and condition 2 may be configured as a combination below.

|  | Primary DRX group | Secondary DRX group |
|---|---|---|
| Condition 1: Not monitor | Short | Short |
| Condition 1: Not monitor | Short | Long |
| Condition 2: Monitor | Long | Short |
| Condition 2: Monitor | Long | Long |
| Condition 2: Not monitor | Short | Active |
| Condition 2: Monitor | Long | Active |

Also, action 1 of operation 4 and action 2 of operation 5 may include sub-operations below.

Action 1
Start next/associated onDuration
SRS transmissions for period 1
■ Period 1=Active time 2+onDuration+subsequent Active time
CSI reporting for period 1
If BWP switching is instructed and the BWP is different from the current BWP, keep the current BWP (ignore the BWP switching command)

Figure 1J:
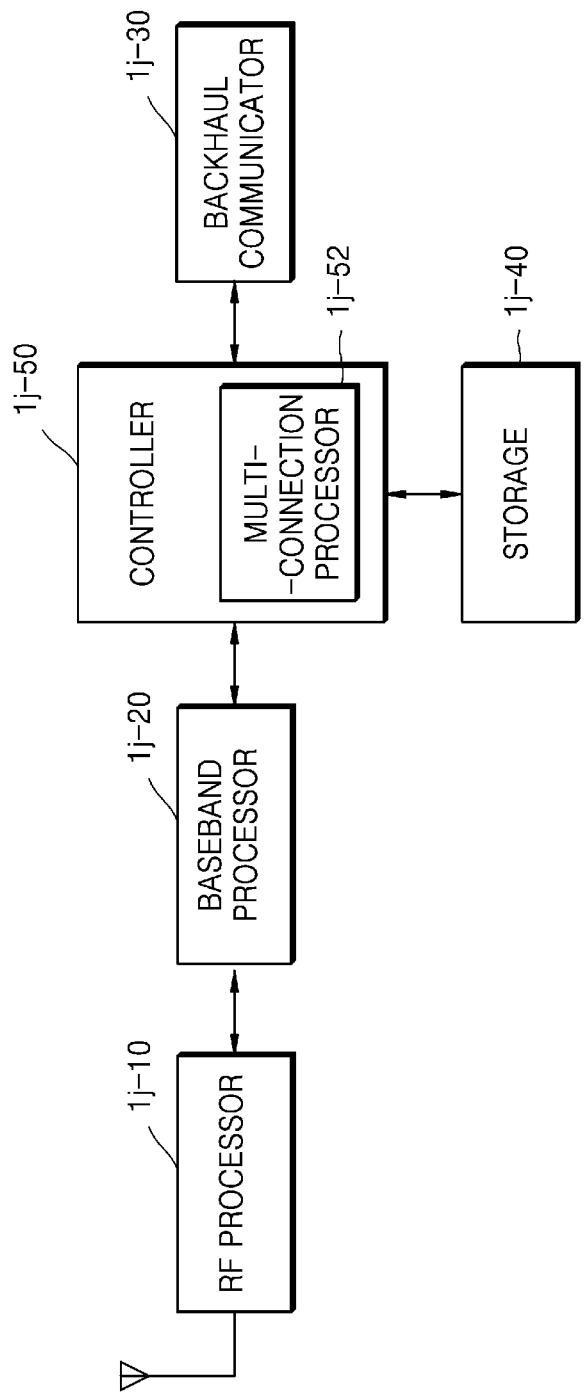
FIG. 1J is a block diagram of a configuration of a BS according to the disclosure.

Action 2
Start next/associated onDuration
SRS transmissions for period 2
■ Period 2=onDuration+subsequent Active time
CSI reporting for period 2
If BWP switching is instructed switch the BWP regardless of the current BWP FIG. 1J is a block diagram of a primary BS in a wireless communication system according to an embodiment of the disclosure.

As illustrated in drawing, the BS includes a RF processor 1*j*-10, a baseband processor 1*j*-20, a backhaul communicator 1*j*-30, a storage 1*j*-40, and a controller 1*j*-50.

The RF processor 1*j*-10 performs functions for transmitting and receiving signals through radio channels, e.g., band conversion and amplification of the signals. That is, the RF processor 1*j*-10 may up-convert a baseband signal provided from the baseband processor 1*j*-20, into an RF band signal and then may transmit the RF band signal through an antenna, and may down-convert an RF band signal received through the antenna, into a baseband signal. For example, the RF processor 1*j*-10 may include a transmit filter, a receive filter, an amplifier, a mixer, an oscillator, a DAC, an ADC, or the like. Although only one antenna is illustrated in drawing, a first access node may include a plurality of antennas. Also, the RF processor 1*j*-10 may include a plurality of RF chains. In addition, the RF processor 1*j*-10 may perform beamforming. For beamforming, the RF processor 1*j*-10 may adjust phases and intensities of signals to be transmitted or received through a plurality of antennas or antenna elements. The RF processor may perform a DL MIMO operation by transmitting one or more layers.

The baseband processor 1*j*-20 converts between a baseband signal and a bit string according to physical layer specifications of a first radio access technology. For example, for data transmission, the baseband processor 1*j*-20 generates complex symbols by encoding and modulating a transmit bit string. For data reception, the baseband processor 1*j*-20 reconstructs a received bit string by demodulating and decoding a baseband signal provided from the RF processor 1*j*-10. For example, according to an OFDM scheme, for data transmission, the baseband processor 1*j*-20 generates complex symbols by encoding and modulating a transmit bit string, may map the complex symbols to subcarriers, and then configures OFDM symbols by performing IFFT and CP insertion. For data reception, the baseband processor 1*j*-20 segments a baseband signal provided from the RF processor 1*j*-10, into OFDM symbol units, reconstructs signals mapped to subcarriers by performing FFT, and then reconstructs a received bit string by demodulating and decoding the signals. The baseband processor 1*j*-20 and the RF processor 1*j*-10 transmit and receive signals as described above. Accordingly, the baseband processor 1*j*-20 and the RF processor 1*j*-10 may also be called a transmitter, a receiver, a transceiver, a communicator, or a wireless communicator.

The backhaul communicator 1*j*-30 provides an interface for performing communication with other nodes in a network. That is, the backhaul communicator 1*j*-30 converts a bit string into a physical signal, the bit string being transmitted from the BS to another node, e.g., an auxiliary BS, a core network, etc., and converts a physical signal into a bit string, the physical signal being received from the other node.

The storage 1*j*-40 stores basic programs, application programs, and data, e.g., configuration information, for operations of a primary BS. In particular, the storage 1*j*-40 may store information about a bearer allocated to an accessing UE, a measurement result reported from the accessing UE, and the like. Also, the storage 1*j*-40 may store information that is a reference as to whether to provide or stop multi-connection to a UE. The storage 1*j*-40 provides the stored data upon request by the controller 1*j*-50.

The controller 1*j*-50 controls overall operations of the primary BS. For example, the controller 1*j*-50 transmits and receives signals via the baseband processor 1*j*-20 and the RF processor 1*j*-10, or the backhaul communicator 1*j*-30. Also, the controller 1*j*-50 records and reads data on or from the storage 1*j*-40. To this end, the controller 1*j*-50 may include at least one processor.

In the disclosure, in a case where a UE is in an inactive state or an idle state, if neighboring cells transmit synchronization signals with multiple time periods are transmitted, provided are descriptions of a signal system in a BS for receiving the signals without missing them.

According to use cases (e.g., a coverage cell or capacity cell) of a cell in a network end, the number of times the UE uses a corresponding cell may vary, and in order to reduce energy consumption of the BE due to the variation, a synchronization signal block (SSB) transmission period may vary. In this case, when the UE currently being in the idle/inactive state performs a selection/reselection operation, SSB measurement time configuration for the UE to measure neighboring cells may be expressed with only one type. If only a short period is notified, the UE may not be able to detect a cell with a long period, and if only a long period is notified, the UE has to wait until a next time window and thus cannot timely reflect a channel change in a cell with a short period.

When the UE in the idle/inactive state performs measurement for mobility, if multiple synchronization signals are transmitted from neighboring cells, the BS may transmit such information, and the UE may generate cell evaluation indices for mobility, in consideration of the synchronization signals with respective periods, and may perform cell selection/reselection.

According to the disclosed embodiment, in a mobile communication system, the UE may effectively receive different types of synchronization signal transmission periods according to use cases of cells.

Figure 2A:
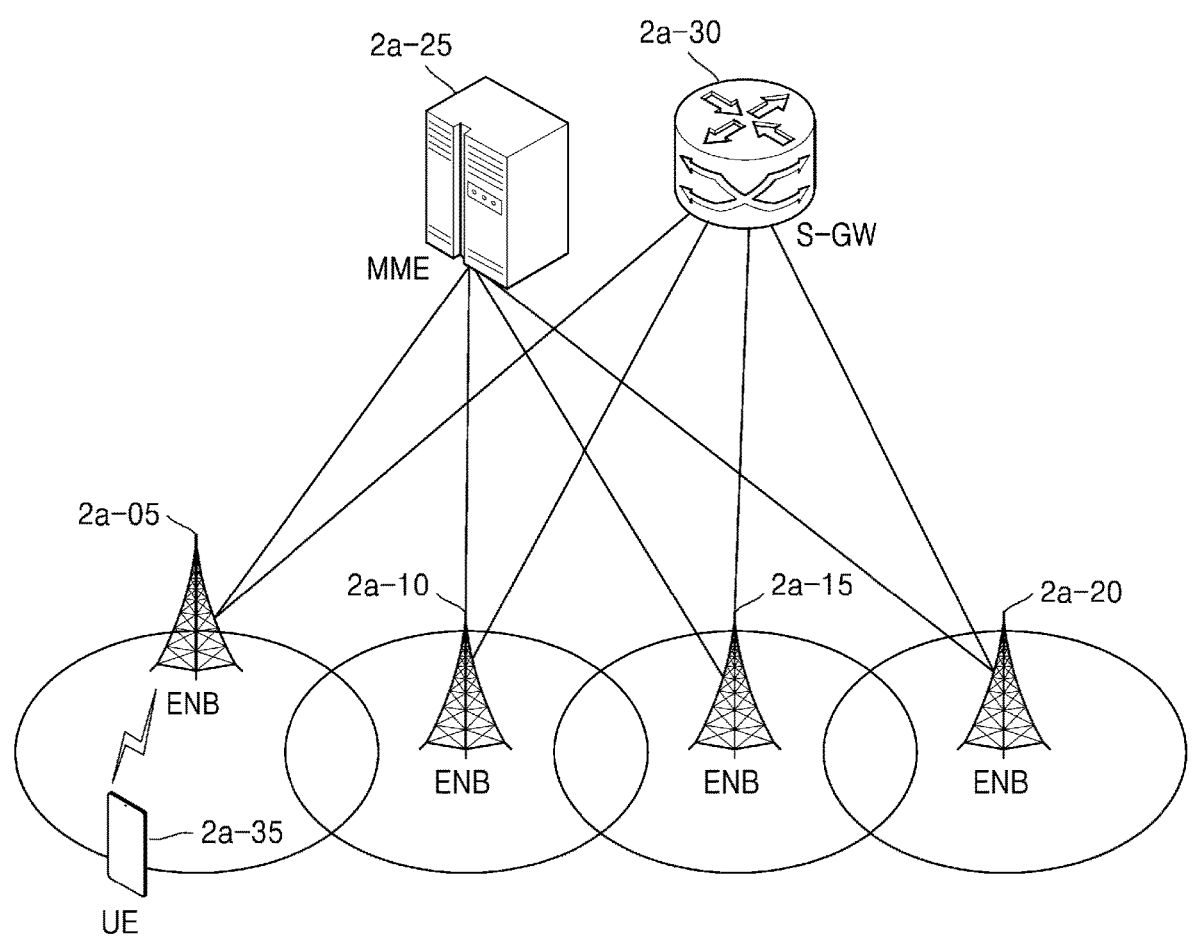
FIG. 2A is a diagram illustrating a configuration of a long term evolution (LTE) system, according to an embodiment of the disclosure.

FIG. 2A is a diagram illustrating a configuration of an LTE system, according to an embodiment of the disclosure.

Referring to FIG. 2A, a radio access network (RAN) of the LTE system includes a plurality of evolved nodes B (eNBs) (or nodes B or base stations) 2a-05, 2a-10, 2a-15, and 2a-20, a mobility management entity (MME) 2a-25, and a serving-gateway (S-GW) 2a-30. A UE (or a terminal) 2a-35 may access an external network via the eNB 2a-05, 2a-10, 2a-15, or 2a-20 and the S-GW 2a-30.

In FIG. 2A, the eNB 2a-05, 2a-10, 2a-15, or 2a-20 may correspond to a legacy node B of a universal mobile telecommunications system (UMTS). The eNB is connected to the UE 2a-35 through wireless channels and performs complex functions compared to the legacy node B. All user traffic data including real-time services such as voice over Internet protocol (VoIP) may be serviced through shared channels in the LTE system. Therefore, an entity for collating status information, e.g., buffer status information, available transmission power status information, and channel state information, of UEs and performing scheduling may be required and the eNB 2a-05, 2a-10, 2a-15, or 2a-20 may operate as such an entity. One eNB may generally control a plurality of cells. For example, the LTE system may use radio access technology such as OFDM at a bandwidth of 20 MHz to achieve a data rate of 100 Mbps. Also, adaptive modulation & coding (AMC) may be used to determine a modulation scheme and a channel coding rate in accordance with a channel state of the UE. The S-GW 2a-30 is an entity for providing data bearers, and may add or release the data bearers, under the control of the MME 2a-25. The MME 2a-25 is an entity for performing a mobility management function and various control functions on the UE and may be connected to the plurality of eNBs.

Figure 2B:
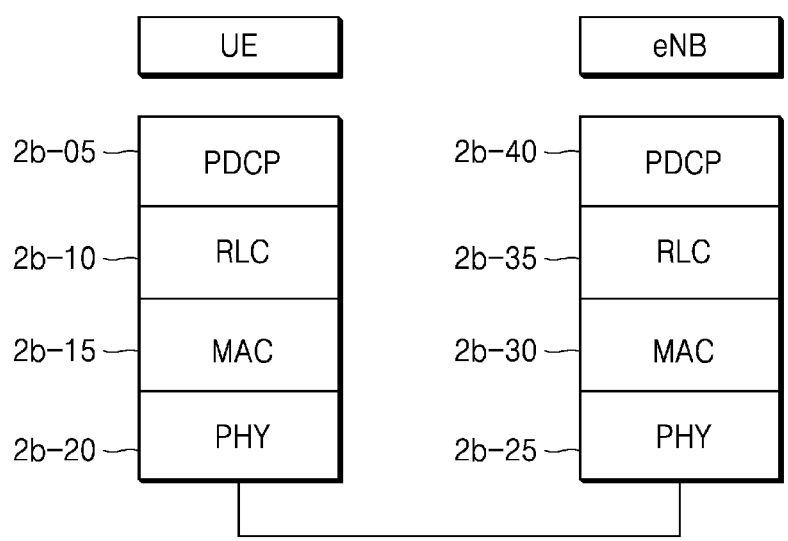
FIG. 2B is a diagram illustrating a radio protocol architecture of an LTE system, according to an embodiment of the disclosure.

FIG. 2B is a diagram illustrating a radio protocol architecture of an LTE system, according to an embodiment of the disclosure.

Referring to FIG. 2B, the radio protocol architecture of the LTE system may include PDCP layers 2b-05 and 2b-40, for Radio Link Control (RLC) layers 2b-10 and 2b-35, and MAC layers 2b-15 and 2b-30 respectively for a UE and an eNB. The PDCP layer may perform, for example, IP header compression/decompression. Main functions of the PDCP layer may be summarized as shown below. However, the functions thereof are not limited thereto.
- Header compression and decompression: robust header compression (ROHC) only
- Transfer of user data
- In-sequence delivery of upper layer Packet Data Units (PDUs) at PDCP re-establishment procedure for RLC Acknowledge Mode (AM)
- For split bearers in DC (only support for RLC AM): PDCP PDU routing for transmission and PDCP PDU reordering for reception
- Duplicate detection of lower layer SDUs at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink.

The RLC layer 2b-10 or 2b-35 may perform an automatic repeat request (ARQ) operation by reconfiguring PDCP PDUs to appropriate sizes. Main functions of the RLC layer may be summarized as shown below. However, the functions thereof are not limited thereto.
- Transfer of upper layer PDUs
- Error Correction through ARQ (only for AM data transfer)
- Concatenation, segmentation and reassembly of RLC SDUs (only for UM and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MAC layer 2b-15 or 2b-30 may be connected to a plurality of RLC layers configured for one UE and may multiplex RLC PDUs into a MAC PDU and may demultiplex the RLC PDUs from the MAC PDU. Main functions of the MAC layer may be summarized as shown below. However, the functions thereof are not limited thereto.
- Mapping between logical channels and transport channels
- Multiplexing/demultiplexing of MAC SDUs belonging to one or different logical channels into/from transport blocks (TB) delivered to/from the physical layer on transport channels
- Scheduling information reporting
- Error correction through HARQ
- Priority handling between logical channels of one UE
- Priority handling between UEs by means of dynamic scheduling
- MBMS service identification
- Transport format selection
- Padding A physical (PHY) layer 2b-20 or 2b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer. However, the functions thereof are not limited thereto.

Figure 2C:
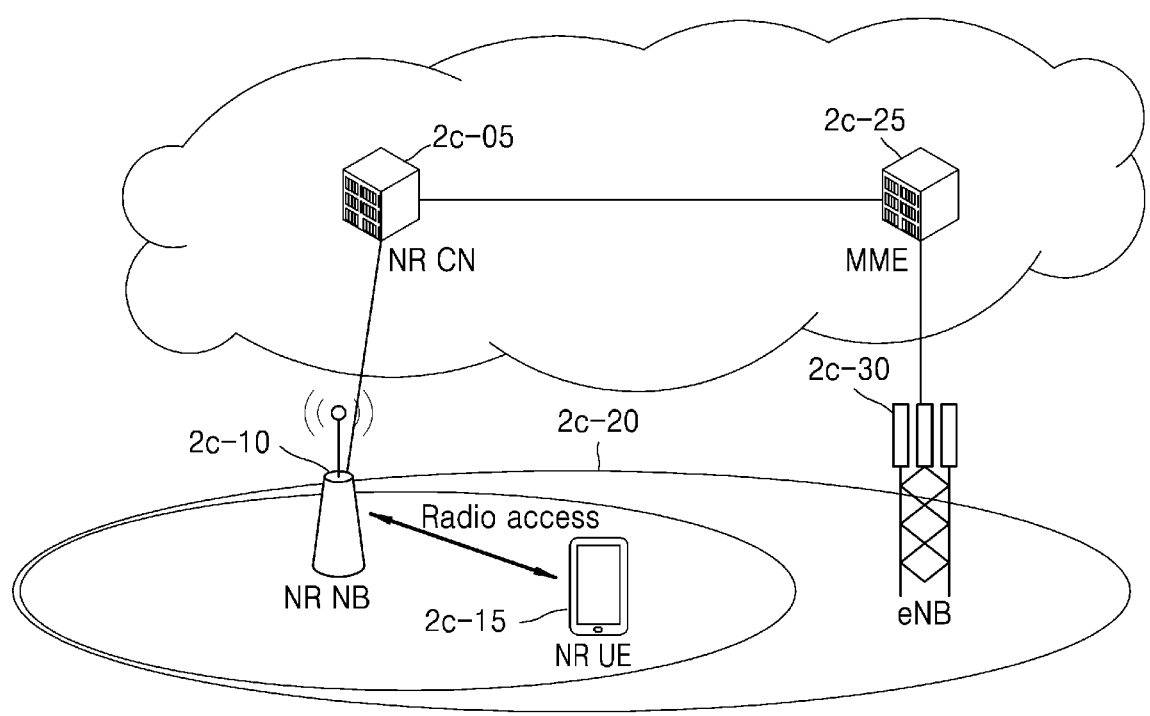
FIG. 2C is a diagram illustrating a next-generation mobile communication system, according to an embodiment of the disclosure.

FIG. 2C is a diagram illustrating a next-generation mobile communication system, according to an embodiment of the disclosure.

Referring to FIG. 2C, as illustrated, a radio access network of the next-generation mobile communication system (hereinafter, referred to as the NR or 5G) communication system) includes a new radio node B (NR gNB, NR NB, or gNB) 2c-10 and a new radio core network (NR CN) 2c-05. A NR UE (or terminal) 2c-15 may access an external network via the NR gNB 2c-10 and the NR CN 2c-05.

In FIG. 2C, the NR gNB 2c-10 may correspond to an eNB of an LTE system. The NR gNB 2c-10 may be connected to the NR UE 2c-15 through radio channels and may provide superior services compared to a legacy node B. All user traffic data may be serviced through shared channels in the NR or 5G mobile communication system. Therefore, an entity for collating buffer status information of UEs, available transmission power status information, and channel state information and performing scheduling may be required and the NR gNB 2c-10 may operate as such an entity. One NR gNB 2c-10 may generally control a plurality of cells. The NR or 5G communication system may have a bandwidth greater than the maximum bandwidth of the current LTE system so as to achieve an ultra-high data rate, compared to the current LTE system. Also, OFDM may be used as a radio access technology and a beamforming technology may be additionally used. Also, AMC may be used to determine a modulation scheme and a channel coding rate in accordance with a channel state of the UE. The NR CN 2c-05 may perform functions such as mobility support, bearer configuration, and QoS configuration. The NR CN 2c-05 is an entity for performing a mobility management function and various control functions on the NR UE and is connected to a plurality of base stations. The NR or 5G mobile communication system may cooperate with the LTE system, and the NR CN 2c-05 may be connected to an MME 2c-25 through a network interface. The MME 2c-25 may be connected to a legacy eNB 2c-30.

Figure 2D:
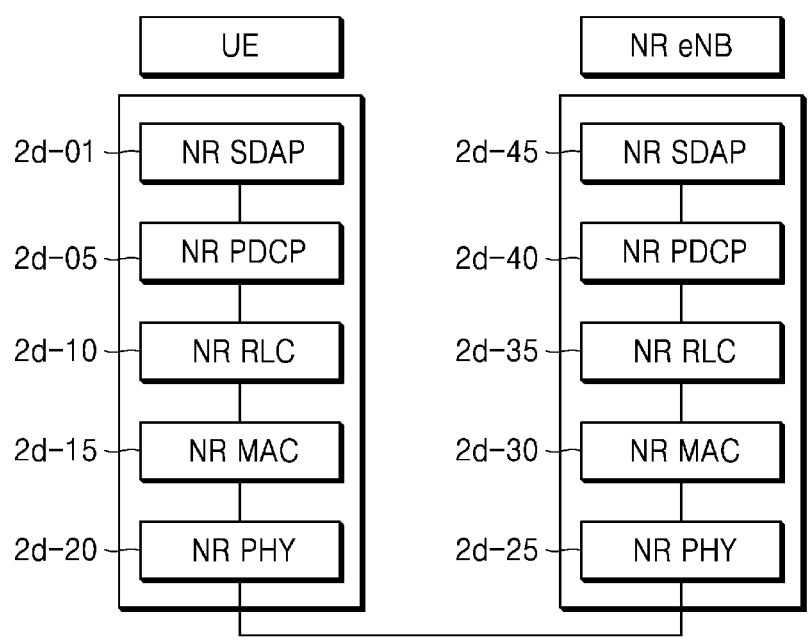
FIG. 2D is a diagram illustrating a radio protocol architecture of a new radio (NR) or $5^{th}$ generation (5G) mobile communication system, according to an embodiment of the disclosure.

FIG. 2D is a diagram illustrating a radio protocol architecture of a NR or 5G mobile communication system, according to an embodiment of the disclosure.

Referring to FIG. 2D, the radio protocol architecture of the NR or 5G mobile communication system may include NR Service Data Adaptation Protocol (SDAP) layers 2d-01 and 2d-45, NR PDCP layers 2d-05 and 2d-40, NR RLC layers 2d-10 and 2d-35, and NR MAC layers 2d-15 and 2d-30 respectively for a UE and an NR gNB.

Main functions of the NR SDAP layer 2d-01 or 2d-45 may include some of the following functions. However, the functions thereof are not limited thereto.

transfer of user plane data
mapping between a QoS flow and a DRB for both DL and UL
marking QoS flow ID in both DL and UL packets
reflective QoS flow to DRB mapping for the UL SDAP PDUs.

With regard to a SDAP layer, information about whether to use a header of the SDAP layer or to use functions of the SDAP layer may be configured for the UE by using a RRC message per PDCP layer, per bearer, or per logical channel. When the SDAP header of the SDAP layer is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. QoS information may be used as data processing priority information or scheduling information for appropriately supporting a service.

Main functions of the NR PDCP layer 2d-05 or 2d-40 may include some of the following functions. However, the functions thereof are not limited thereto.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above descriptions, the reordering function of the NR PDCP layer may indicate a function of reordering PDCP PDUs received from a lower layer, on a PDCP sequence number (SN) basis. The reordering function of the NR PDCP layer may include at least one of a function of delivering the reordered data to an upper layer in order, a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 2d-10 or 2d-35 may include some of the following functions. However, the functions thereof are not limited thereto.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC layer indicates a function of delivering RLC SDUs received from a lower layer to an upper layer in order. When a plurality of RLC SDUs segmented from one RLC SDU are received, the in-sequence delivery function of the NR RLC layer may include at least one of a function of reassembling the RLC SDUs and delivering the reassembled RLC SDU.

The in-sequence delivery function of the NR RLC layer may include at least one of a function of reordering received RLC PDUs on a RLC SN or PDCP SN basis, a function of recording missing RLC PDUs by reordering the received RLC PDUs, a function of reporting status information of the missing RLC PDUs to a transmitter, and a function of requesting to retransmit the missing RLC PDUs. The in-sequence delivery function of the NR RLC layer may include a function of delivering only RLC SDUs prior to a missing RLC SDU, to an upper layer in order when the missing RLC SDU exists. The in-sequence delivery function of the NR RLC layer may include a function of delivering all RLC SDUs received before a timer starts, to an upper layer in order although a missing RLC SDU exists when a certain timer expires. The in-sequence delivery function of the NR RLC layer may include a function of delivering all RLC SDUs received so far, to an upper layer in order although a missing RLC SDU exists when a certain timer expires.

The NR RLC layer may process the RLC PDUs in order of reception and deliver the RLC PDUs to the NR PDCP layer regardless of SNs (out-of-sequence delivery).

When the NR RLC layer receives a segment, the NR RLC layer may reassemble the segment with other segments stored in a buffer or subsequently received, into a whole RLC PDU and may deliver the RLC PDU to the NR PDCP layer.

The NR RLC layer may not have a concatenation function, and the concatenation function may be performed by the NR MAC layer or be replaced with a multiplexing function of the NR MAC layer.

In the descriptions above, the out-of-sequence delivery function of the NR RLC layer may include a function of directly delivering RLC SDUs received from a lower layer to an upper layer out of order. The out-of-sequence delivery function of the NR RLC layer may include a function of reassembling a plurality of RLC SDUs segmented from one RLC SDU and delivering the reassembled RLC SDU when the segmented RLC SDUs are received. The out-of-sequence delivery function of the NR RLC layer may include a function of recording missing RLC PDUs by storing RLC SNs or PDCP SNs of received RLC PDUs and reordering the received RLC PDUs.

The NR MAC layer 2d-15 or 2d-30 may be connected to a plurality of NR RLC layers configured for one UE, and main functions of the NR MAC layer may include some of the following functions. However, the functions thereof are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 2d-20 or 2d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 2E:
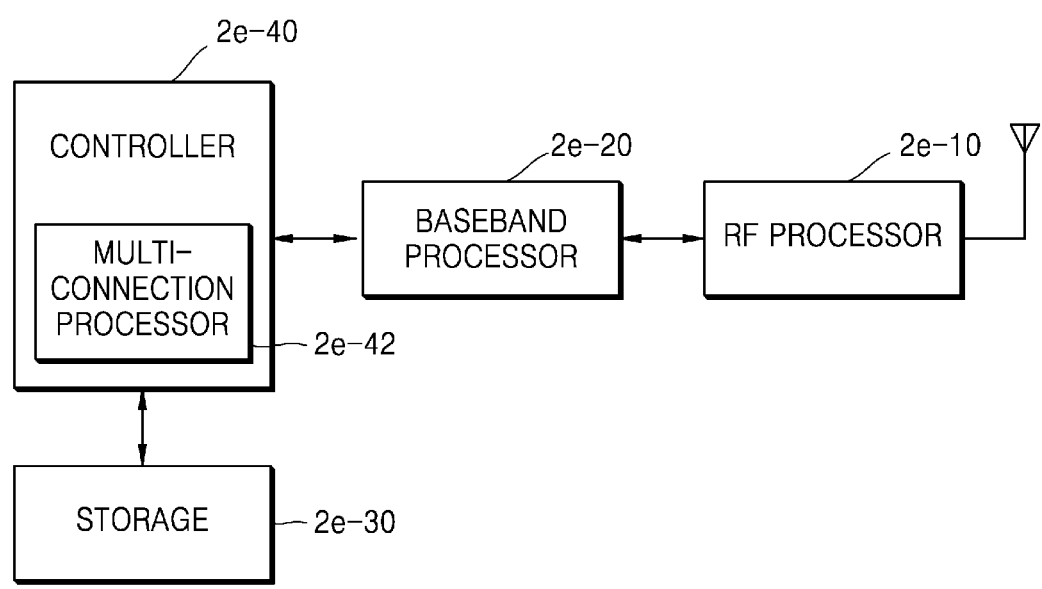
FIG. 2E is a block diagram of a configuration of a UE, according to an embodiment of the disclosure.

FIG. 2E is a block diagram of a configuration of a UE, according to an embodiment of the disclosure.

Referring to FIG. 2E, the UE may include a RF processor 2e-10, a baseband processor 2e-20, a storage 2e-30, and a controller 2e-40.

The RF processor 2e-10 may perform functions for transmitting and receiving signals through radio channels, e.g., band conversion and amplification of the signals. That is, the RF processor 2e-10 may up-convert a baseband signal provided from the baseband processor 2e-20, into an RF band signal and then may transmit the RF band signal through an antenna, and may down-convert an RF band signal received through the antenna, into a baseband signal. For example, the RF processor 2e-10 may include a transmit filter, a receive filter, an amplifier, a mixer, an oscillator, a DAC, an ADC, or the like. However, the disclosure is not limited thereto. Although only one antenna is illustrated in FIG. 2E, the UE may include a plurality of antennas. Also, the RF processor 2e-10 may include a plurality of RF chains. In addition, the RF processor 2e-10 may perform beamforming. For beamforming, the RF processor 2e-10 may adjust phases and intensities of signals to be transmitted or received through a plurality of antennas or antenna elements. Also, the RF processor may perform a MIMO operation and may receive a plurality of layers in the MIMO operation.

The baseband processor 2e-20 may convert between a baseband signal and a bit string according to physical layer specifications of a system. For example, for data transmission, the baseband processor 2e-20 may generate complex symbols by encoding and modulating a transmit bit string. For data reception, the baseband processor 2e-20 may reconstruct a received bit string by demodulating and decoding a baseband signal provided from the RF processor 2e-10. For example, according to an OFDM scheme, for data transmission, the baseband processor 2e-20 may generate complex symbols by encoding and modulating a transmit bit string, may map the complex symbols to subcarriers, and then may configure OFDM symbols by performing IFFT and CP insertion. For data reception, the baseband processor 2e-20 may segment a baseband signal provided from the RF processor 2e-10, into OFDM symbol units, may reconstruct signals mapped to subcarriers by performing FFT, and then may reconstruct a received bit string by demodulating and decoding the signals.

The baseband processor 2e-20 and the RF processor 2e-10 may transmit and receive signals as described above. Accordingly, the baseband processor 2e-20 and the RF processor 2e-10 may also be called a transmitter, a receiver, a transceiver, or a communicator. Furthermore, at least one of the baseband processor 2e-20 and the RF processor 2e-10 may include a plurality of communication modules to support a plurality of different radio access technologies. At least one of the baseband processor 2e-20 and the RF processor 2e-10 may include different communication modules to process signals of different frequency bands. For example, the different radio access technologies may include a wireless LAN (for example: IEEE 802.11), a cellular network (for example: LTE), or the like. The different frequency bands may include a SHF (e.g., 2.NRHz, NRhz) band and an mmWave (e.g., 60 GHz) band. The UE may transmit and receive signals to and from the BS by using the baseband processor 2e-20 and the RF processor 2e-10. Here, the signals may include control information and data.

The storage 2e-30 may store basic programs, application programs, and data, e.g., configuration information, for operations of the UE. In particular, the storage 2e-30 may store information about a second access node that performs wireless communication by using a second radio access technology. The storage 2e-30 provides the stored data upon request by the controller 2e-40. The storage 2e-30 may include any or a combination of storage media such as ROM, RAM, a hard disk, a CD-ROM, and a DVD. Also, the storage 2e-30 may include a plurality of memories.

The controller 2e-40 may control overall operations of the UE. For example, the controller 2e-40 may transmit and receive signals via the baseband processor 2e-20 and the RF processor 2e-10. Also, the controller 2e-40 may record and read data on or from the storage 2e-40. To this end, the controller 2e-40 may include at least one processor. For example, the controller 2e-40 may include a CP for controlling communications and an AP for controlling an upper layer such as an application program. Also, the controller 2e-40 may control the UE to perform beam-based handover. Also, at least one configuration in the UE may be implemented as one chip.

Figure 2F:
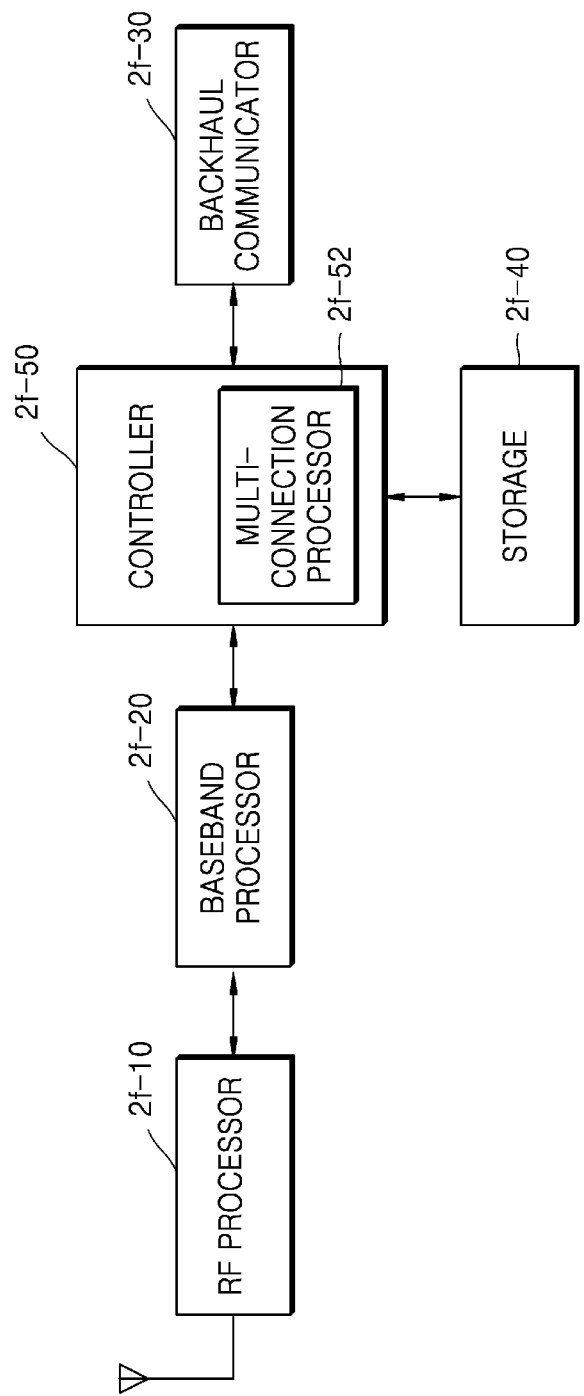
FIG. 2F is a block diagram of a configuration of a base station (BS), according to an embodiment of the disclosure.

FIG. 2F is a block diagram of a configuration of an NR BS, according to an embodiment of the disclosure.

Referring to FIG. 2F, the BS may include a RF processor 2f-10, a baseband processor 2f-20, a backhaul communicator 2f-30, a storage 2f-40, and a controller 2f-50.

The RF processor 2f-10 may perform functions for transmitting and receiving signals through radio channels, e.g., band conversion and amplification of the signals. That is, the RF processor 2f-10 may up-convert a baseband signal provided from the baseband processor 2f-20, into an RF band signal and then may transmit the RF band signal through an antenna, and may down-convert an RF band signal received through the antenna, into a baseband signal. For example, the RF processor 2f-10 may include a transmit filter, a receive filter, an amplifier, a mixer, an oscillator, a DAC, an ADC, or the like. However, the disclosure is not limited thereto. Although only one antenna is illustrated in the embodiment of FIG. 2F, the BS may include a plurality of antennas. Also, the RF processor 2f-10 may include a plurality of RF chains. In addition, the RF processor 2f-10 may perform beamforming. For beamforming, the RF processor 2f-10 may adjust phases and intensities of signals to be transmitted or received through a plurality of antennas or antenna elements. The RF processor may perform a MIMO operation by transmitting one or more layers.

The baseband processor 2f-20 may convert between a baseband signal and a bit string according to physical layer specifications of a first radio access technology. For example, for data transmission, the baseband processor 2f-20 may generate complex symbols by encoding and modulating a transmit bit string. For data reception, the baseband processor 2f-20 may reconstruct a received bit string by demodulating and decoding a baseband signal provided from the RF processor 2f-10. For example, when the radio access technology follows an OFDM scheme, for data transmission, the baseband processor 2f-20 may generate complex symbols by encoding and modulating a transmit bit string, may map the complex symbols to subcarriers, and then may configure OFDM symbols by performing IFFT and CP insertion. For data reception, the baseband processor 2f-20 may segment a baseband signal provided from the RF processor 2f-10, into OFDM symbol units, may reconstruct signals mapped to subcarriers by performing FFT, and then may reconstruct a received bit string by demodulating and decoding the signals.

The baseband processor 2f-20 and the RF processor 2f-10 transmit and receive signals as described above. Accordingly, the baseband processor 2f-20 and the RF processor 2f-10 may also be called a transmitter, a receiver, a transceiver, a communicator, or a wireless communicator.

The backhaul communicator 2f-30 may provide an interface for performing communication with other nodes in a network. That is, the backhaul communicator 2f-30 may convert a bit string into a physical signal, the bit string being transmitted from a primary BS to another node, e.g., an auxiliary BS, a core network, etc., and may convert a physical signal into a bit string, the physical signal being received from the other node.

The storage 2f-40 may store basic programs, application programs, and data, e.g., configuration information, for operations of the primary BS. In particular, the storage 2f-40 may store information about a bearer allocated to an accessing UE, a measurement result reported from the accessing UE, and the like. Also, the storage 2f-40 may store information that is a reference as to whether to provide or stop multi-connection to a UE. The storage 2f-40 may provide the stored data upon request by the controller 2f-50. The storage 2f-40 may include any or a combination of storage media such as ROM, RAM, a hard disk, a CD-ROM, and a DVD. Also, the storage 2f-40 may include a plurality of memories.

The controller 2f-50 may control overall operations of the primary BS. For example, the controller 2f-50 may transmit and receive signals via the baseband processor 2f-20 and the RF processor 2f-10, or the backhaul communicator 2f-30. Also, the controller 2f-50 may record and read data on or from the storage 2f-40. To this end, the controller 2f-50 may include at least one processor.

Figure 2G:
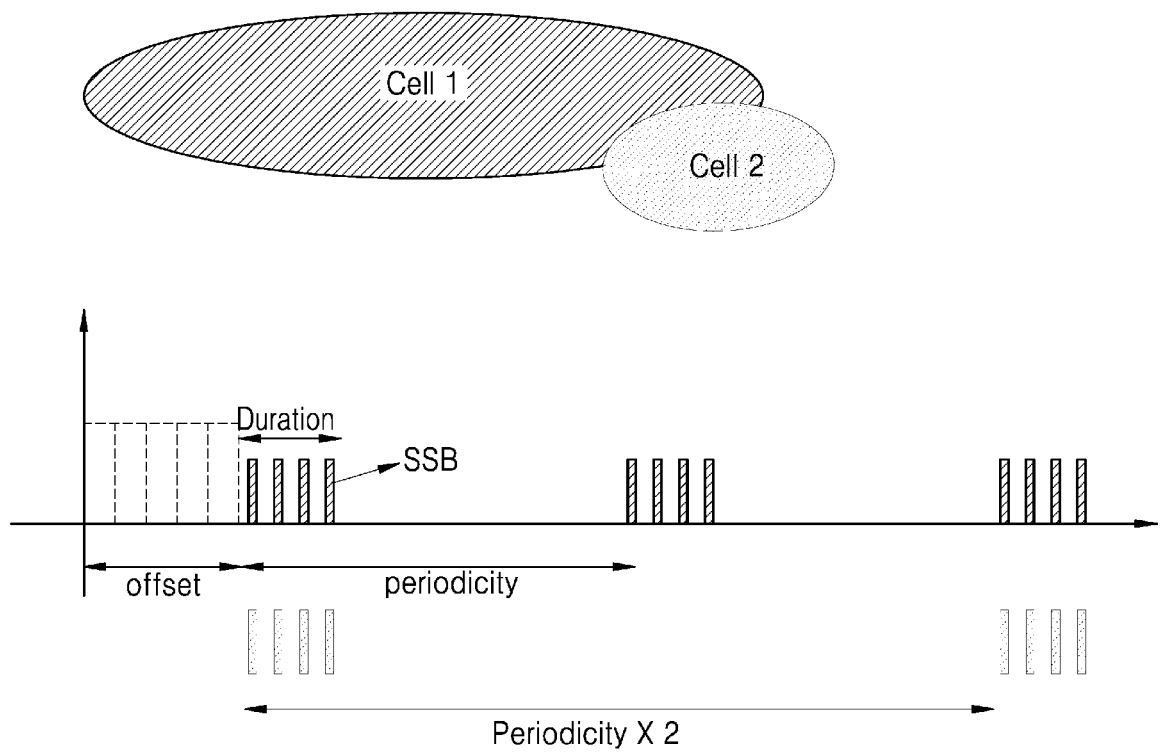
FIG. 2G is a diagram for describing how a UE recognizes a measurement occasion when SS/PBCH Block Measurement Time Configuration (smtc) information for each frequency or each measurement object is given according to an embodiment of the disclosure.

FIG. 2G is a diagram for describing how a UE recognizes a measurement occasion when SS/PBCH Block Measurement Time Configuration (smtc) information for each frequency or each measurement object is given according to an embodiment of the disclosure.

In an embodiment, a serving cell may transmit smtc information about Cell 1 to the UE. Also, in an embodiment, when Cell 1 and the serving cell operate on a same frequency, the UE may regard smtc information as information about Cell 1, the smtc information being included in an RRC message received from the serving cell. In an embodiment, a system information block (SIB) may include smtc information for each measurement object. Upon reception of such smtc information, the UE may identify a candidate time period in which a synchronous signal/physical broadcast channel (SS/PBCH) block desired in duration information included in the smtc information is to be transmitted. Also, the UE may identify one of few patterns of a preset offset value and periodicity, via PeriodicityAndOffset information included in the smtc. In an embodiment, an offset value indicates that a measurement occasion is to start at a time point later than SFN0 of a cell by the offset value, the cell having transmitted the SIB including the smtc information. Periodicity indicates an interval between adjacent time periods in which measurement occasions start. In an embodiment, a plurality of pieces of information described above may be differently configured for each measurement object.

In an embodiment, when smtc with longer periodicity is configured, some neighboring cells operating on the same frequency may operate by amending only periodicity based on previous smtc. That is, when smtc with long periodicity is configured, duration and offset of a previous one (short periodicity) may be changelessly used, and long periodicity may be separately signaled. That is, smtc with short periodicity and smtc with long periodicity may coexist on the same frequency whereas at least one of duration and offset for configurations of two smtcs may be a same value.

In an embodiment, long periodicity and short periodicity may be configured to have a relation of a real-number multiple (e.g., 2, 3, 4 . . . ).

In an embodiment, smtc or smtc1 may be regarded as smtc with long periodicity, and smtc2 may be regarded as smtc with short periodicity. Also, smtc or smtc1 may be called long smtc, and smtc2 may be called short smtc.

In an embodiment, smtc or smtc1 may be regarded as smtc with short periodicity, and smtc2 may be regarded as smtc with long periodicity. Also, smtc or smtc1 may be called short smtc, and smtc2 may be called long smtc.

Figure 2H:
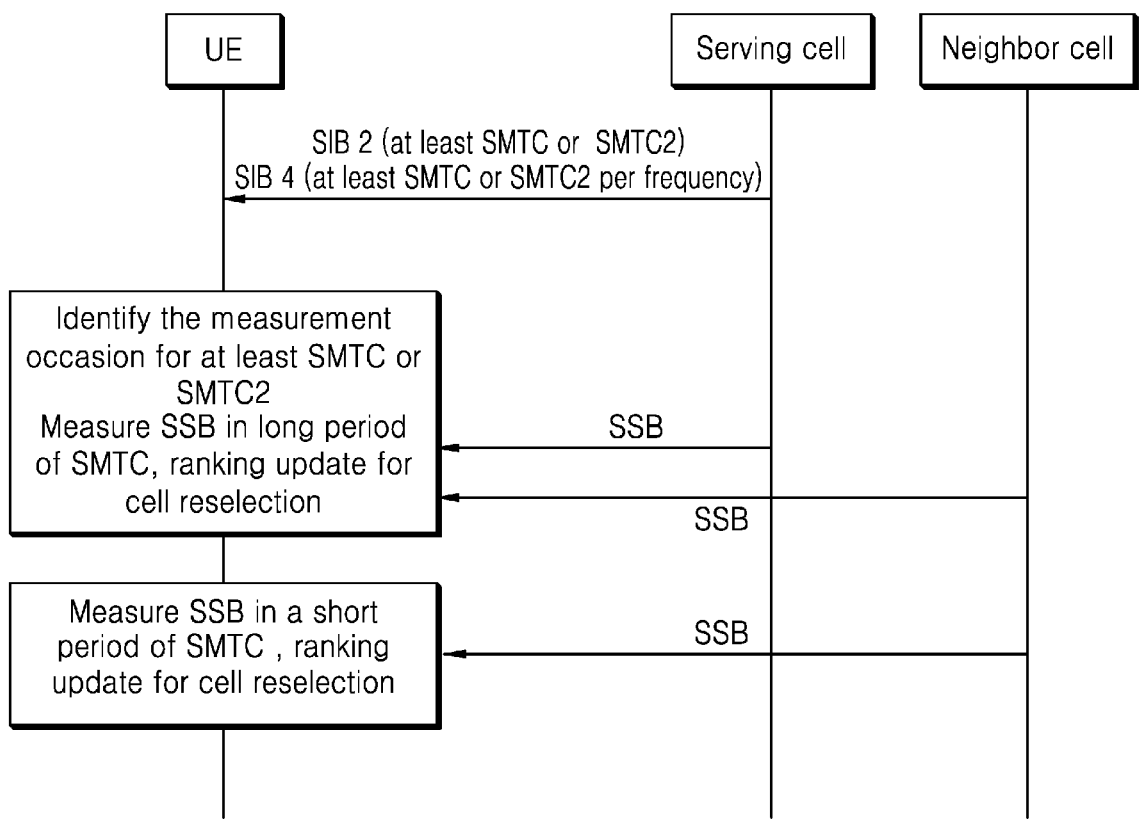
FIG. 2H is a procedure in which a UE in an idle mode or an inactive mode receives two types of smtc information from a BS and performs measurement according to an embodiment of the disclosure.

FIG. 2H is a procedure in which a UE in an idle mode or an inactive mode receives two types of smtc broadcast information from a BS and performs measurement according to an embodiment of the disclosure.

Referring to FIG. 2H, a serving BS may transmit SIB2 and SIB4 including smtc2 to the UE. SIB2 may include frequency information for intra-frequency cell reselection and information for performing measurement on a corresponding frequency. In an embodiment, SIB2 may provide smtc information about a serving frequency. In an embodiment, SIB2 may provide smtc2 information about the serving frequency. SIB4 may include frequency information for inter-frequency cell reselection and information for performing measurement on a corresponding frequency. In an embodiment, SIB4 may provide smtc information for each frequency. In an embodiment, SIB4 may provide smtc2 information for each frequency. In an embodiment, smtc or smtc2 information may include at least one of a plurality of pieces of information below.

Periodicity: This may indicate smtc2 periodicity different from smtc1. According to various embodiments, this may indicate a value being smaller than the definition in Smtc1. According to various embodiments, this may indicate a value being greater than the definition in Smtc1. According to various embodiments, the periodicity of smtc2 may deliver a value for dividing smtc1. In more detail, with respect to a periodicity value of smtc2, the BS may transmit a natural number n to the UE, and the UE may calculate the periodicity value of smtc2 by periodicity of smtc1/n (where n is a natural number).

pci-list: Physical Cell ID (pci) list of cells which transmit an SS/PBCH block in corresponding smtc2

Ssb-ToMeasure: Information designated to an SS/PBCH block index value to be used when measurement is performed in corresponding smtc2 deriveSSB-IndexFromCell: Information indicating whether or not to derive an SS/PBCH block index via serving cell reference time information Also, as a legacy operation, a smtc value is broadcast for each of frequencies for serving frequency and inter-frequency. According to various embodiments, information included in smtc may be one of the followings.

Duration

PeriodictyAndOffset

Ssb-ToMeasure: Information designated to an SS/PBCH block index value to be used when measurement is performed in corresponding smtc1 deriveSSB-IndexFromCell: Information indicating whether or not to derive an SS/PBCH block index via serving cell reference time information Upon reception of such information, the UE transitions to an idle mode or an inactive mode, and then performs neighboring cell measurement for cell reselection evaluation through operations below by using parameters received in SIB2 and SIB4.

SIB2 provides smtc and smtc2 information as information for a serving frequency. The UE may identify measurement duration and an offset value that is information for a start time of duration, by using duration and periodicityAndOffset value of smtc. The UE may also determine first periodicity from the periodicityAndOffset value included in smtc. The UE may determine second periodicity based on a Periodicity value of smtc2. The UE may use the offset value included in smtc, as offset for smtc2. A first measurement occasion may be determined by using measurement duration and measurement offset extracted from SMTC, and SFN/subframe number of a cell having received first measurement periodicity and SIB (here, SIB2) having transmitted SMTC. According to an embodiment, in the first measurement occasion, all cells excluding a blacklisted cell may be measured.

In this case, a blacklist may not exist. Also, the UE may perform measurement on all detectable cells.

A second measurement occasion may be determined by using measurement duration, measurement offset, the second periodicity and SFN/subframe number of a cell receiving SIB having transmitted smtc2. In the second measurement occasion, the UE may measure only cells indicated by pci-list.

In another embodiment, if smtc and smtc2 are simultaneously signaled via SIB2, the UE may measure, in first measurement occasion via smtc, other cells excluding a blacklisted cell and cells indicated by pci-list of smtc2. Simultaneously, the UE may measure, in second measurement occasion via smtc2, only cells indicated by pci-list. When periodicity of smtc is smaller than periodicity of smtc2, such example may be considered.

Also, SIB2 may provide, as information for intra-frequency, information of ssb-ToMeasure and deriveSSB-IndexFromCell for each of SMTC and SMTC2. ssb-ToMeasure is bitmap information, in which SS/PBCH block indices are indicated in order of bits such as a first/leftmost bit corresponds to an SS/PBCH block index 0, a second bit corresponds to an SS/PBCH block index 1, and the like. When each bit is 0, this indicates that a corresponding SS/PBCH block is not to be measured, and when each bit is 1, this indicates that a corresponding SS/PBCH block is to be measured. When ssb-ToMeasure is given, the UE measures beams of an SS/PBCH block index of which bit indicates 1 in each SMTC measurement occasion via corresponding information.

deriveSSB-IndexFromCell is a Boolean value, and may be configured as true/false. When the value is false, the UE may require a process of identifying a block index of a SS/PBCH block which is known from SMTC/SMTC2 by decoding a PBCH included in an SS/PBCH block of each neighboring cell. When a value of deriveSSB-IndexFromCell is true, and this information is received via SIB2, the UE may determine that SFN/subframe boundaries of a neighboring cell and a serving cell are synchronized. In this case, the UE may identify an index of an SS/PBCH block of the neighboring cell without decoding a PBCH. Here, the serving cell and neighboring cells sequentially transmit, from a same time point (offset from SFN0), an SSB with an index of 0 through same symbol duration, such that the UE can identify which index an SSB is transmitted with, based on a time. According to an embodiment, the UE may detect indices of SS/PBCH blocks in SMTC/SMTC2 by using deriveSSB-IndexFromCell value, and may identify an index of an SS/PBCH block to be measured according to ssb-ToMeasure and may perform measurement in a unit of SS/PBCH block by using SMTC/SMTC2 information.

SIB4 may provide, as information about inter-frequency measurement, at least one of SMTC or SMTC2 for each frequency. The UE may identify measurement duration and an offset value that is information for a start time of duration, by using duration and periodicityAndOffset value of smtc. The UE may also determine first periodicity from the periodicityAndOffset value included in smtc. The UE may determine second periodicity from a Periodicity value of smtc2. The UE may use the offset value included in smtc, as offset for smtc2. A first measurement occasion may be determined by using measurement duration and measurement offset extracted from SMTC, and SFN/subframe number of a cell having received first measurement periodicity and SIB (here, SIB4) having transmitted SMTC. According to an embodiment, in the first measurement occasion, all cells excluding a blacklisted cell may be measured. In this case, a blacklist may not exist. Also, the UE may perform measurement on all detectable cells.

A second measurement occasion may be determined by using measurement duration, measurement offset, the second periodicity and SFN/subframe number of a cell receiving SIB having transmitted smtc2. In the second measurement occasion, the UE may measure only cells indicated by pci-list.

In another embodiment, if smtc and smtc2 are simultaneously signaled via SIB4, the UE may measure, in first measurement occasion via smtc, other cells excluding a blacklisted cell and cells indicated by pci-list of smtc2. Simultaneously, the UE may measure, in second measurement occasion via smtc2, only cells indicated by pci-list. When periodicity of smtc is smaller than periodicity of smtc2, such example may be considered.

Also, when there is only smtc for each of measurement frequencies indicated by SIB4, the UE measures reception power for all detected cells excluding a blacklisted cell in a corresponding frequency via a first measurement occasion with respect to the corresponding frequency. Alternatively, when smtc2 exists, the UE measures reception power not only for a cell corresponding to the first measurement occasion but also for cells indicated for a second measurement occasion.

Also, SIB4 may provide, as information for inter-frequency, information of ssb-ToMeasure and deriveSSB-IndexFromCell for each of smtc and smtc2. ssb-ToMeasure is bitmap information, in which SS/PBCH block indices are indicated in order of bits such as a first/leftmost bit corresponds to an SS/PBCH block index 0, a second bit corresponds to an SS/PBCH block index 1, and the like. When each bit is 0, this indicates that a corresponding SS/PBCH block is not to be measured, and when each bit is 1, this indicates that a corresponding SS/PBCH block is to be measured. When ssb-ToMeasure is given, the UE measures beams of an SS/PBCH block index of which bit indicates 1 in each smtc measurement occasion via corresponding information.

deriveSSB-IndexFromCell is a Boolean value, and may be configured as true/false. When the value is false, the UE may require a process of identifying a block index of a SS/PBCH block which is known from smtc/smtc2 by decoding a PBCH included in an SS/PBCH block of each neighboring cell. When a value of deriveSSB-IndexFromCell is true, and this information is received via SIB4, the UE may determine that SFN/subframe boundaries of a neighboring cell and a serving cell are synchronized. In this case, the UE may identify an index of an SS/PBCH block of the neighboring cell without decoding a PBCH. Here, the serving cell and neighboring cells sequentially transmit, from a same time point (offset from SFN0), an SSB with an index of 0 through same symbol duration, such that the UE can identify which index an SSB is transmitted with, based on a time. According to an embodiment, the UE may detect indices of SS/PBCH blocks in smtc/smtc2 by using deriveSSB-IndexFromCell value, and may identify an index of an SS/PBCH block to be measured according to ssb-ToMeasure and may perform measurement in a unit of SS/PBCH block by using smtc/smtc2 information. In an embodiment, the measurement in a unit of SS/PBCH block may include measurement of power of at least one from among a secondary synchronization signal (SSS), a demodulation reference signal (DMRS) of a PBCH, and a channel-state information reference signal (CSI-RS) quasi co-located (QCL) with an SS/PBCH block.

Figure 2I:
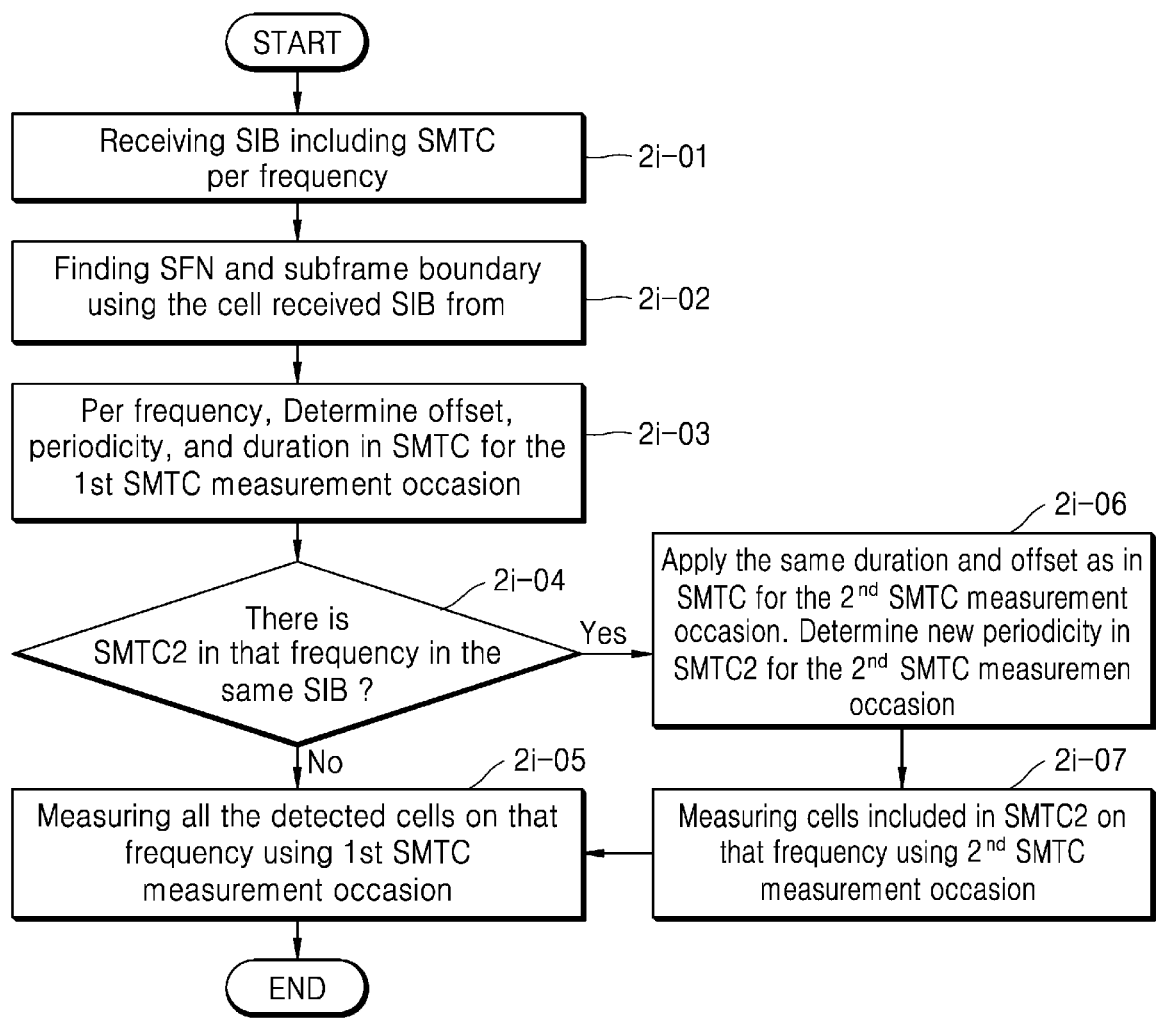
FIG. 2I is a diagram illustrating a measurement operation for cell reselection by a UE having received smtc/smtc2 information according to an embodiment of the disclosure.

FIG. 2I is a diagram illustrating a measurement operation for cell reselection by a UE having received smtc/smtc2 information according to an embodiment of the disclosure.

In an embodiment, SIB may be at least one of SIB2 or SIB4. At least one of operations described below may be omitted or amended.

In operation 2i-01, when the UE receives an SIB including smtc information with respect to a particular frequency, in operation 2i-02, the UE may find SFN and subframe boundary based on a time of a cell which receives the SIB. In an embodiment, the particular frequency may be a frequency on which a serving BS operates. In an embodiment, the particular frequency may be a frequency indicated by a measurement object included in SIB4. In operation 2i-03, the UE determines, with respect to a corresponding frequency, offset, duration, and periodicity information so as to determine a first SS/PBCH block measurement occasion for measuring an SS/PBCH block by using information included in smtc. In operation 2i-04, if smtc2 is not configured in the received SIB with respect to a same frequency, in operation 2i-05, the UE performs, by using the first SS/PBCH block measurement occasion, measurement on cells existing on a corresponding frequency in a corresponding occasion. In operation 2i-04, if smtc2 is configured in the received SIB with respect to a same frequency, in operation 2i-06, the UE determines values of offset and duration as a value configured in smtc so as to determine a second SS/PBCH block measurement occasion, and determines periodicity as the second SS/PBCH block measurement occasion, the periodicity being configured in smtc2. In operation 2i-07, the UE performs, by using the 2 SS/PBCH block measurement occasion, measurement on particular cells configured in smtc2 on a corresponding frequency. In an embodiment, the measurement in a unit of SS/PBCH block may include measurement of power of at least one from among an SSS, a DMRS of a PBCH, and a CSI-RS quasi co-located with an SS/PBCH block.

In an embodiment, a method by which the UE measures an SS/PBCH block with respect to the particular cells configured in smtc2 may include a method of performing filtering based on Physical Cell ID (pci) included in smtc2 configuration value. That is, pci value (N_ID) of a neighboring cell may be determined based on a first pci value (e.g., N_ID1 in Equation below) identifiable via a primary synchronization signal (PSS) and a second pci value (e.g., N_ID2 in Equation below) identifiable via an SSS, which are included in an SS/PBCH block. In an embodiment, a pci of a neighboring cell may be calculated according to [Equation 1] below.

$$N\_ID=N\_ID1+3*N\_ID2 \quad\quad\quad \text{[Equation 1]}$$

In an embodiment, the UE may sequentially identify a first pci and a second pci which are identifiable via a PSS and an SSS included in an SS/PBCH block. According to an embodiment, in a case where a sequential scheme is used, when a value calculated via 3 modular operation (a residual value divided by 3) to pci of the particular cells configured in smtc2 is different from the first pci identifiable via the PSS, the UE may omit at least one of PBCH decoding or a measurement procedure with respect to a corresponding cell.

In an embodiment, when the first pci and second pci values which are identifiable via the PSS and the SSS included the SS/PBCH block are different from the pci of the particular cells configured in smtc2, the UE may omit at least one of PBCH decoding or a measurement procedure with respect to a corresponding cell.

Figure 2J:
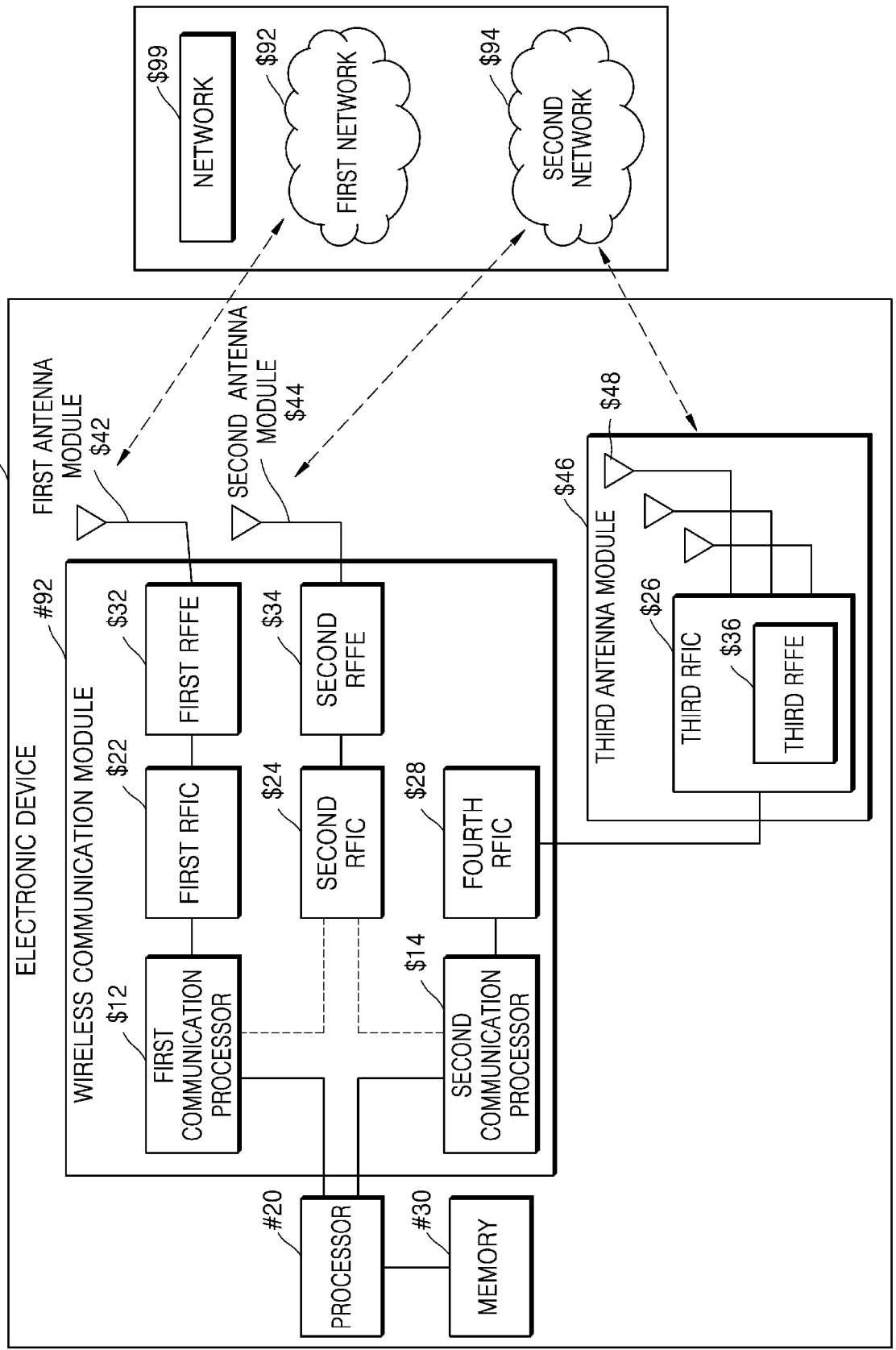
FIG. 2J is a block diagram of an electronic device for supporting legacy network communication and 5G network communication according to an embodiment of the disclosure.

FIG. 2J is a block diagram of an electronic device for supporting legacy network communication and 5G network communication according to an embodiment.

Referring to FIG. 2J, an electronic device #01 may include a first communication processor $12, a second communication processor $14, a first radio frequency integrated circuit (RFIC) $22, a second RFIC $24, a third RFIC $26, a fourth RFIC $28, a first radio frequency front end (RFFE) $32, a second RFFE $34, a first antenna module $42, a second antenna module $44, and an antenna $48. The electronic device #01 may further include at least one processor #20 and at least one memory #30. A network #99 may include a first network $92 and a second network $94. According to another embodiment, the electronic device #01 may further include at least one component not illustrated in FIG. 10, and the network #99 may further include at least one another network. In an embodiment, the first communication processor $12, the second communication processor $14, the first RFIC $22, the second RFIC $24, the fourth RFIC $28, the first RFFE $32, and the second RFFE $34 may configure a part of a wireless communication module #92. In an embodiment, the fourth RFIC $28 may be omitted or may be included as a part of the third RFIC $26.

The first communication processor $12 may support establishment of a communication channel of a band to be used in wireless communication with the first network $92, and legacy network communication via the established communication channel. In an embodiment, the first network may be a legacy network including $2^{nd}$ generation (2g), 3rd generation (3G), 4th generation (4G), or long term evolution (LTE) network. The second communication processor $14 may support establishment of a communication channel corresponding to a designated band (for example: about 6 GHz to about 60 GHz) in a band to be used in wireless communication with the second network $94, and 5G network communication via the established communication channel. In an embodiment, the second network $94 may be a 5G network defined in the 3GPP. In addition, in an embodiment, the first communication processor $12 or the second communication processor $14 may support establishment of a communication channel corresponding to other designated band (for example: below about 6 GHz) in a band to be used in wireless communication with the second network $94, and 5G network communication via the established communication channel. In an embodiment, the first communication processor $12 and the second communication processor $14 may be implemented in a single chip or a single package. In an embodiment, the first communication processor $12 or the second communication processor $14 may be implemented with the processor #20, an auxiliary processor #23, or a communication module #90 in a single chip or a single package.

In transmission, the first RFIC $22 may convert a baseband signal, which is generated by the first communication processor $12, into a radio frequency (RF) signal of about 700 MHz to about 3 GHz used in the first network $92 (e.g., a legacy network). In reception, an RF signal may be obtained from the first network $92 (e.g., the legacy network) via an antenna (for example: the first antenna module $42), and may be preprocessed by the first RFFE $32. The first RFIC $22 may convert the preprocessed RF signal into a baseband signal to be processed by the first communication processor $12.

In transmission, the second RFIC $24 may convert a baseband signal, which is generated by the first communication processor $12, the second communication processor $14, into an RF signal of a Sub6 band (for example: below about 6 GHz) used in the second network $94 (for example: the 5G network) (hereinafter, the 5G Sub6 RF signal). In reception, a 5G Sub6 RF signal may be obtained from the second network $94 (for example: the 5G network) via an antenna (for example: the second antenna module $44), and may be preprocessed by an RFFE (for example: the second RFFE $34). The second RFIC $24 may convert the preprocessed 5G Sub6 RF signal into a baseband signal to be processed by a communication processor corresponding to the first communication processor $12 or the second communication processor $14.

The third RFIC $26 may convert a baseband signal, which is generated by the second communication processor $14, into an RF signal of a 5G Above6 band (for example: about 6 GHz to about 60 GHz) to be used in the second network $94 (for example: the 5G network) (hereinafter, the 5G Above6 RF signal). In reception, the 5G Above6 RF signal may be obtained from the second network $94 (for example: the 5G network) via an antenna (for example: the antenna $48), and may be preprocessed by a third RFFE $36. The third RFIC $26 may convert the preprocessed 5G Above6 RF signal into a baseband signal to be processed by the second communication processor $14. In an embodiment, the third RFFE $36 may be implemented as a part of the third RFIC $26.

In an embodiment, the electronic device #01 may include the fourth RFIC $28 separately from or as at least a part of the third RFIC $26. In this case, the fourth RFIC $28 may convert a baseband signal, which is generated by the second communication processor $14, into a signal of an intermediate frequency band (for example: about 9 GHz to about 11 GHz) (hereinafter, the IF signal), and may deliver the IF signal to the third RFIC $26. The third RFIC $26 may convert the IF signal into a 5G Above6 RF signal. In reception, a 5G Above6 RF signal may be received from the second network $94 (for example: the 5G network) via an antenna (for example: the antenna $48), and may be converted into an IF signal by the third RFIC $26. The fourth RFIC $28 may convert the IF signal into a baseband signal to be processed by the second communication processor $14.

In an embodiment, the first RFIC $22 and the second RFIC $24 may be implemented as a single chip or as at least a part of a single package. In an embodiment, the first RFFE $32 and the second RFFE $34 may be implemented as a single chip or as at least a part of a single package. In an embodiment, at least one of the first antenna module $42 or the second antenna module $44 may be omitted or may be combined with other antenna module to process RF signals of a plurality of bands.

In an embodiment, the third RFIC $26 and the antenna $48 may be disposed on a same substrate so as to form a third antenna module $46. For example, the wireless communication module #92 or the processor #20 may be disposed on a first substrate (e.g., a main printed circuit board (PCB)). In this case, the third RFIC $26 may be disposed on a portion (e.g., on a bottom surface) of a second substrate (e.g., a sub-PCB) independent of the first substrate and the antenna $48 may be disposed on another portion (e.g., on a top surface) of the second substrate, such that the third antenna module $46 may be formed. In an embodiment, the antenna $48 may include, for example, an antenna array that may be used for beamforming. As the third RFIC $26 and the antenna $48 are disposed on the same substrate, a length of a transmission line therebetween may be reduced. By doing so, for example, the loss (for example: attenuation) of a signal due to the transmission line, the signal being of high-frequency band (for example: about 6 GHz to about 60 GHz) used for 5G network communication, may be reduced. Accordingly, the electronic device #01 may improve the quality or speed of communication with the second network $94 (for example: the 5G network).

The second network $94 (for example: the 5G network) may be used independently of the first network $92 (for example: a legacy network) (for example: stand-alone (SA)), or may be used in conjunction with the first network $92 (for example: non-stand alone (NSA)). For example, only an access network (e.g., a 5G radio access network (RAN) or a next generation RAN (NG RAN)) may exist in the 5G network, and a core network (for example: a next generation core (NGC)) may not exist in the 5G network. In this case, the electronic device #01 may access the access network of the 5G network, and then may access an external network (for example: the Internet) under control of the core network (for example: an evolved packed core (EPC)) of the legacy network. Protocol information (for example: LTE protocol information) for communication with the legacy network or protocol information (for example: NR protocol information) for communication with the 5G network may be stored in a memory $30, and may be accessed by another component (for example: the processor #20, the first communication processor $12, or the second communication processor $14).

Both a 4G system (LTE) and a 5G system are based on OFDM. In the LTE system, a subcarrier spacing (SCS) is fixed to be 15 kHz, but in the 5G system, a plurality of subcarrier spacings (SCSs), for example, 7.5 kHz, 15 kHz, 30 kHz, 60 kHz, 120 kHz, and the like, may be supported to provide various services (e.g., eMBB, URLLC, mMTC, and the like) and to provide wireless communication in various frequency ranges (e.g., sub-6 GHz, above-6 GHz, and the like). Furthermore, the 5G system may allow a plurality of SCSs to be time division multiplexed (TDM) or frequency division multiplexed (FDM) even within a single carrier. Also, a maximum bandwidth of a component carrier (CC) in the LTE system is assumed to be 20 MHz. However, the 5G system may consider a maximum bandwidth of a CC to be up to 1 GHz.

Therefore, in a case of the 5G system, radio resources having different SCSs may be FDM or TDM. In LTE, a subframe is assumed to be a base unit of scheduling. However, in the 5G system, a slot including 14 symbols may be assumed to be a base unit of scheduling. That is, in LTE, an absolute time of a subframe is always fixed to be 1 ms. However, in the 5G system, a length of a slot may vary according to an SCS.

In particular, the 3GPP defines a synchronous signal/physical broadcast channel (SS/PBCH) block for a synchronous signal (SS) which is used for an initial access procedure of the 5G system. The SS/PBCH block may include at least a primary synchronous signal (PSS), a secondary synchronous signal (SSS), and a PBCH. When the SS/PBCH block is transmitted, the PSS, the SSS, and the PBCH may always be transmitted in a certain sequence. Also, the SS/PBCH block may be transmitted with one of 15 kHz, 30 kHz, 120 kHz, and 240 kHz SCS according to a frequency band. In detail, the SS/PBCH block may be transmitted with 15 kHz or 30 kHz SCS in a sub-6 GHz frequency band, and may be transmitted with 120 kHz or 240 kHz SCS in an above-6 GHz frequency band. The above frequency band may be classified in more detail and the SS/PBCH block may be transmitted in each frequency band.

Also, multiple SS/PBCH blocks may be transmitted in one operating band. This is to allow UEs with different capabilities to coexist and operate in a system bandwidth. In this case, although the system bandwidth increases, a location of an SS/PBCH block received by a UE may vary according to network settings. Also, a transmission time of the SS/PBCH block may also vary according to the network settings. Also, a transmission interval of the SS/PBCH block may not be constant. In more detail, as the following message, information indicating a channel bandwidth of a system may provide an SCS value used in the channel bandwidth.

Figure 2K:
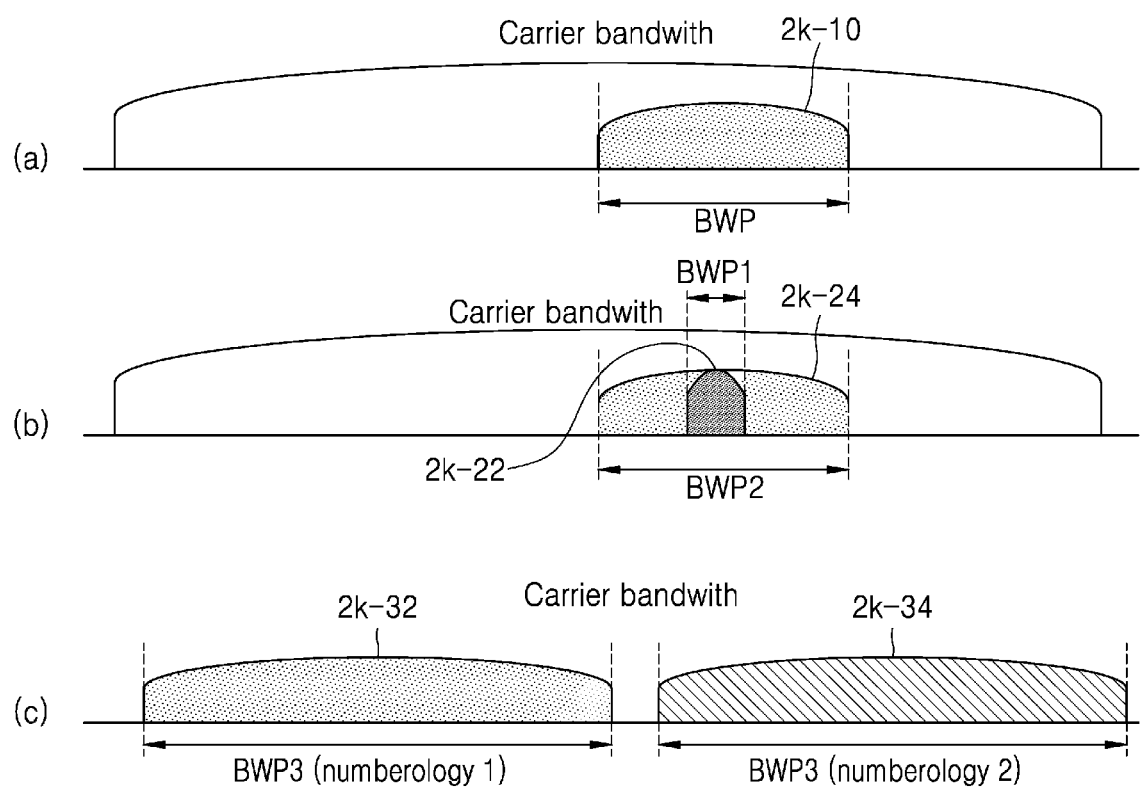
FIGS. 2K and 2L are diagrams for describing a bandwidth adaptation technology according to an embodiment of the disclosure.
Figure 2L:
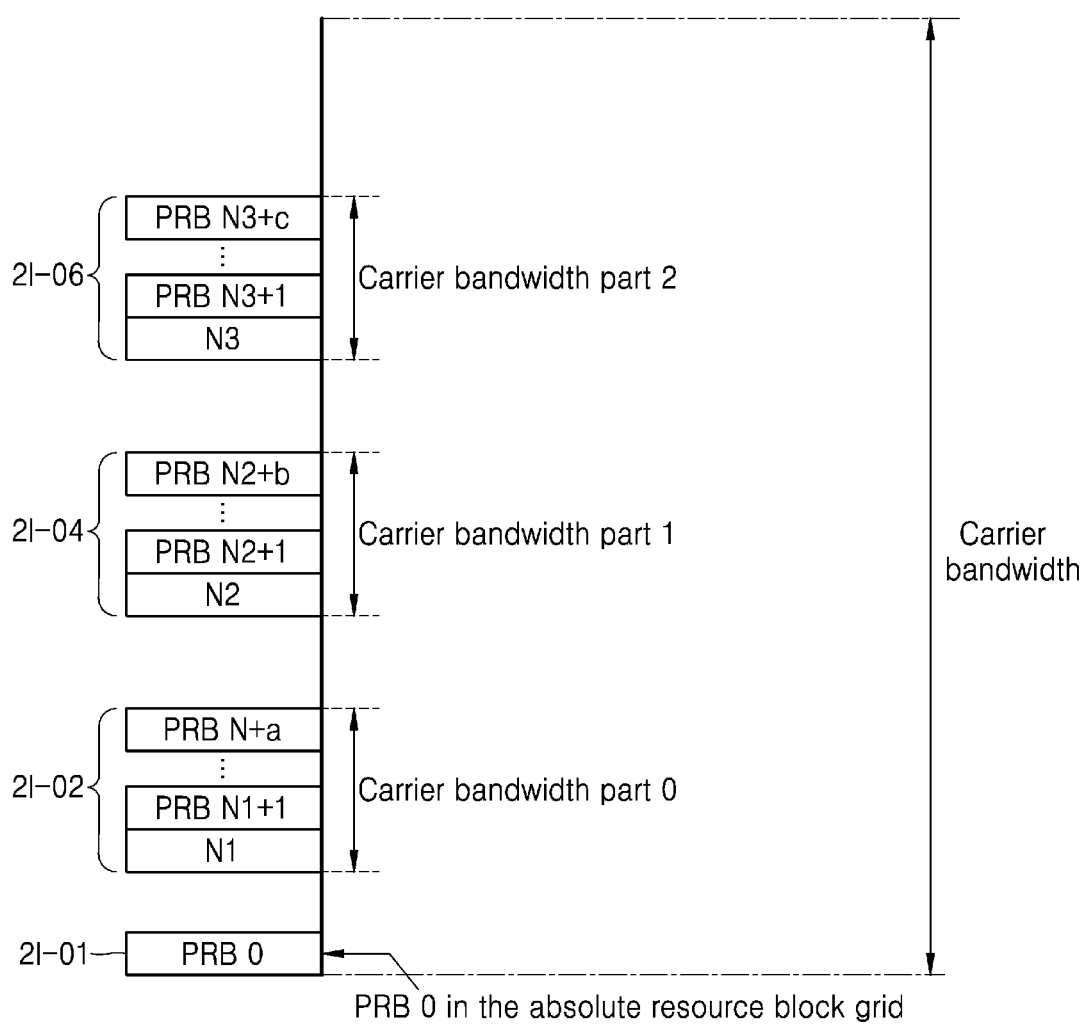

FIGS. 2K and 2L are diagrams for describing a bandwidth adaptation technology according to an embodiment of the disclosure.

Referring to FIG. 2K, as in (a) to (c) of FIG. 2K, a BS may provide information about a bandwidth part (hereinafter, 'BWP') associated with a carrier bandwidth. A UE may receive the information about the BWP from the BS. In an embodiment, the information about the BWP may include bandwidth part configuration information. In an embodiment, the bandwidth part configuration information may include configuration values required for the UE to use a bandwidth of a transmission signal as the BWP. For example, the bandwidth part configuration information may include numerology information associated with a location of a frequency resource on the BWP, a bandwidth of the frequency resource on the BWP, and an operation on the BWP. In an embodiment, the numerology information about the BWP may include at least one of subcarrier spacing (SCS) information, a type of a cyclic prefix (e.g., the type indicating whether it is a normal cyclic prefix or an extended cyclic prefix) of OFDM, or the number of symbols (e.g., 7 symbols or 14 symbols) included in one slot. In an embodiment, the UE may activate at least one BWP, based on the bandwidth part configuration information received from the BS, and may transmit or receive a control signal or data, based on the activated BWP.

Referring to (a) of FIG. 2K, the UE may receive, from the BS, bandwidth part configuration information about one BWP 2k-10, and may activate the BWP 2k-10 based on the bandwidth part configuration information about the BWP 2k-10. According to an embodiment, the BWP 2k-10 may be an operating band configured based on RF performance of the UE.

Referring to (b) of FIG. 2K, the UE may receive, from the BS, bandwidth part configuration information about a plurality of BWPs (e.g., BWP1 2k-22 and BWP2 2k-24). In an embodiment, the plurality of BWPs may include a BWP (e.g., BWP1 2k-22) associated with a basic operating band configured based on RF performance of the UE, and may additionally include a BWP (e.g., BWP2 2k-24) associated with an additional operating band. In an embodiment, the BWP associated with the additional operating band may be plural in number. In an embodiment, the BWP associated with the additional operating band may be a BWP having a numerology characteristic being different from the basic operating band. In an embodiment, BWPs associated with at least two operating bands may be BWPs having numerology characteristics being different from each other. The UE may select and activate at least one of BWP1 2k-22 and BWP2 2k-24, based on the bandwidth part configuration information about BWP1 2k-22 and the bandwidth part configuration information about BWP2 2k-24. In an embodiment, the BS may indicate the UE to select and activate at least one of BWP1 2k-22 and BWP2 2k-24.

Referring to (c) of FIG. 2K, the UE may receive, from the BS, bandwidth part configuration information about a plurality of BWPs (e.g., BWP3 (numerology1) 2k-32 and BWP3 (numerology2) 2k-34) having numerology characteristics being different from each other. In an embodiment, the plurality of BWPs may include BWP3 (numerology1) 2k-32 having a first numerology characteristic or BWP3 (numerology2) 2k-34 having a second numerology characteristic. The UE may select and activate at least one of BWP3 (numerology1) 2k-32 and BWP3 (numerology2) 2k-34, based on numerology information included in the bandwidth part configuration information about BWP3 (numerology1) 2k-32 and the bandwidth part configuration information about BWP3 (numerology2) 2k-34. For example, the UE may select and activate at least one of BWP3 (numerology1) 2k-32 and BWP3 (numerology2) 2k-34, based on at least one of subcarrier spacing (SCS) information, a type of a cyclic prefix (e.g., the type indicating whether it is a normal cyclic prefix or an extended cyclic prefix) of OFDM, or the number of symbols (e.g., 7 symbols or 14 symbols) included in one slot from among the numerology information included in the bandwidth part configuration information about BWP3 (numerology 1) 2k-32 and the bandwidth part configuration information about BWP3 (numerology2) 2k-34.

In an embodiment, the UE may select a BWP to be activated from among a plurality of BWPs based on reception of an RRC signal from the BS, or may select a BWP to be activated based on information indicating whether activation is performed, included in at least one bandwidth part configuration information from among bandwidth part configuration information about the plurality of BWPs. In an embodiment, the UE may select a BWP to be activated, based on reception of downlink control information (DCI) from the BS. In an embodiment, the UE may select a BWP to be activated, based on reception of an MAC CE from the BS.

In an embodiment, when the RRC signal is used, the BS may include, in the RRC signal, frequency resource information allocated from a network, or may include, in the RRC signal, time information related to at least one BWP, and may transmit it. For example, the UE may select and activate one of BWPs, based on the frequency resource information allocated from the network included in the RRC signal, or the time information related to at least one BWP included in the RRC signal. For example, the time information related to at least one BWP may include a time pattern for changing BWPs. The time pattern may include operation slot information or subframe information of the BWPs, or designated operation times of the BWPs.

In an embodiment, when bandwidth part configuration information is used, a bitmap indicating whether activation is performed may be included in bandwidth part configuration information of BWPs. The UE may select a BWP to be activated based on the bitmap. For example, a value of the bitmap may be 0 or 1, and when the value is 0 (or 1 or another designated value), it may indicate activation, and when the value is 1 (or 0 or another designated value), it may indicate inactivation. The UE may select a BWP to be activated based on a value of the bitmap included in the bandwidth part configuration information of BWPs.

In an embodiment, when the DCI is used, the BS may include, in the DCI, information indicating to activate at least one BWP. The UE may select a BWP to be activated from among a plurality of BWPs based on the information included in the DCI. If the information included in the DCI is equal to an already-activated BWP (e.g., BWP1 2k-22), the UE may ignore a value of the DCI, and if the information included in the DCI is different from the already-activated BWP (e.g., BWP1 2k-22), the UE may change the already-activated BWP1 2k-22 to a BWP (e.g., BWP2 2k-24) corresponding to the information included in the DCI and activate the BWP. For example, after a certain time (e.g., a time in a slot unit or a time in a subframe unit) after reception of the DCI, the UE may activate BWP2 2k-12.

In an embodiment, when the DCI is used, the bandwidth part configuration information of BWPs may include an index indicating whether activation is performed. The UE may select a BWP to be activated, based on the index. In an embodiment, DCI may include indices of respective BWPs included in bandwidth part configuration information. For example, when the UE receives DCI including an index of a BWP to be activated, the UE may activate the corresponding BWP and deactivate other BWPs.

In an embodiment, when an MAC CE is used, the BS may include, in the MAC CE, information indicating to activate at least one BWP. The UE may select, based on the information included in the MAC CE, a BWP to be activated from among a plurality of BWPs. If the information included in the MAC CE is equal to an already-activated BWP (e.g., BWP1 2k-10), the UE may ignore a value of the MAC CE, and if the information included in the MAC CE is different from the already-activated BWP (e.g., BWP1 2k-10), the UE may change the already-activated BWP1 2k-10 to a BWP (e.g., BWP2 2k-12) corresponding to the information included in the MAC CE and activate the BWP. For example, after a certain time (e.g., a time in a slot unit or a time in a subframe unit) after reception of the MAC CE, the UE may activate BWP2 2k-12.

Referring to FIG. 2L, according to various embodiments, BWPs (examples: carrier bandwidth part0, carrier bandwidth part1, or carrier bandwidth part2) may be allocated within a carrier bandwidth. According to an embodiment, the BWPs may be allocated based on a physical resource block (hereinafter, 'PRB'), e.g., PRB0 2k-01, designated within the carrier bandwidth. The PRB may refer to a designated bandwidth unit available for the UE. In an embodiment, a plurality of PRBs may be allocated to a plurality of BWPs. For example, a plurality of PRBs N1 to N1+a 2k-02 may be allocated to carrier bandwidth part0, a plurality of PRBs N2 to N2+b 2k-04 may be allocated to carrier bandwidth part1, and a plurality of PRBs N3 to N3+c 2k-02k—may be allocated to carrier bandwidth part3. For example, N1, N2, or N3 may indicate a start PRB, and a, b, c may indicate a bandwidth number of BWPs which is the number of PRBs.

In an embodiment, the UE may use a bandwidth corresponding to a full BWP, or may use a bandwidth corresponding to at least one PRB included in a BWP.

Figure 2M:
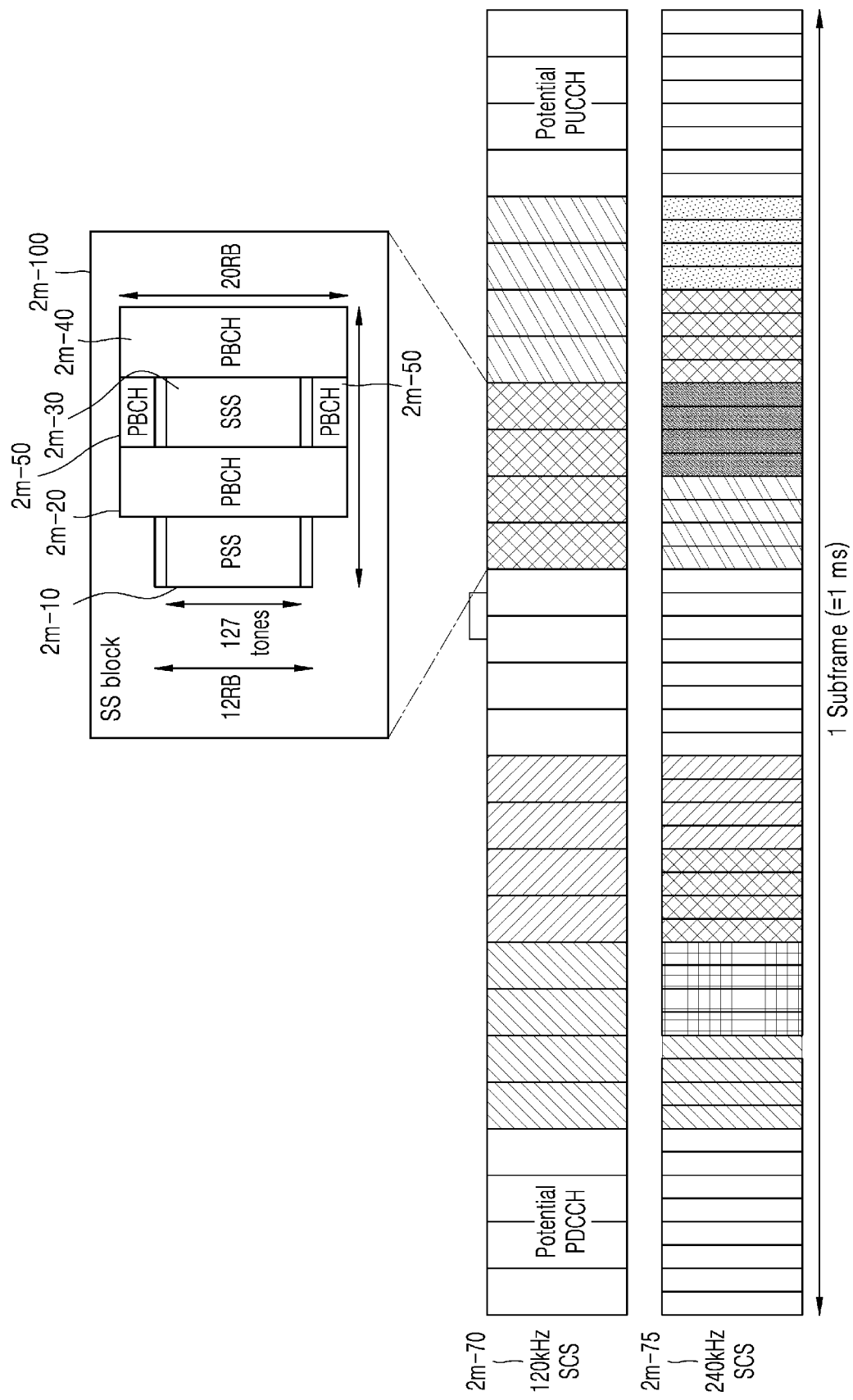
FIGS. 2M and 2N are diagrams illustrating an example of an SS/PBCH block according to an embodiment of the disclosure.
Figure 2N:
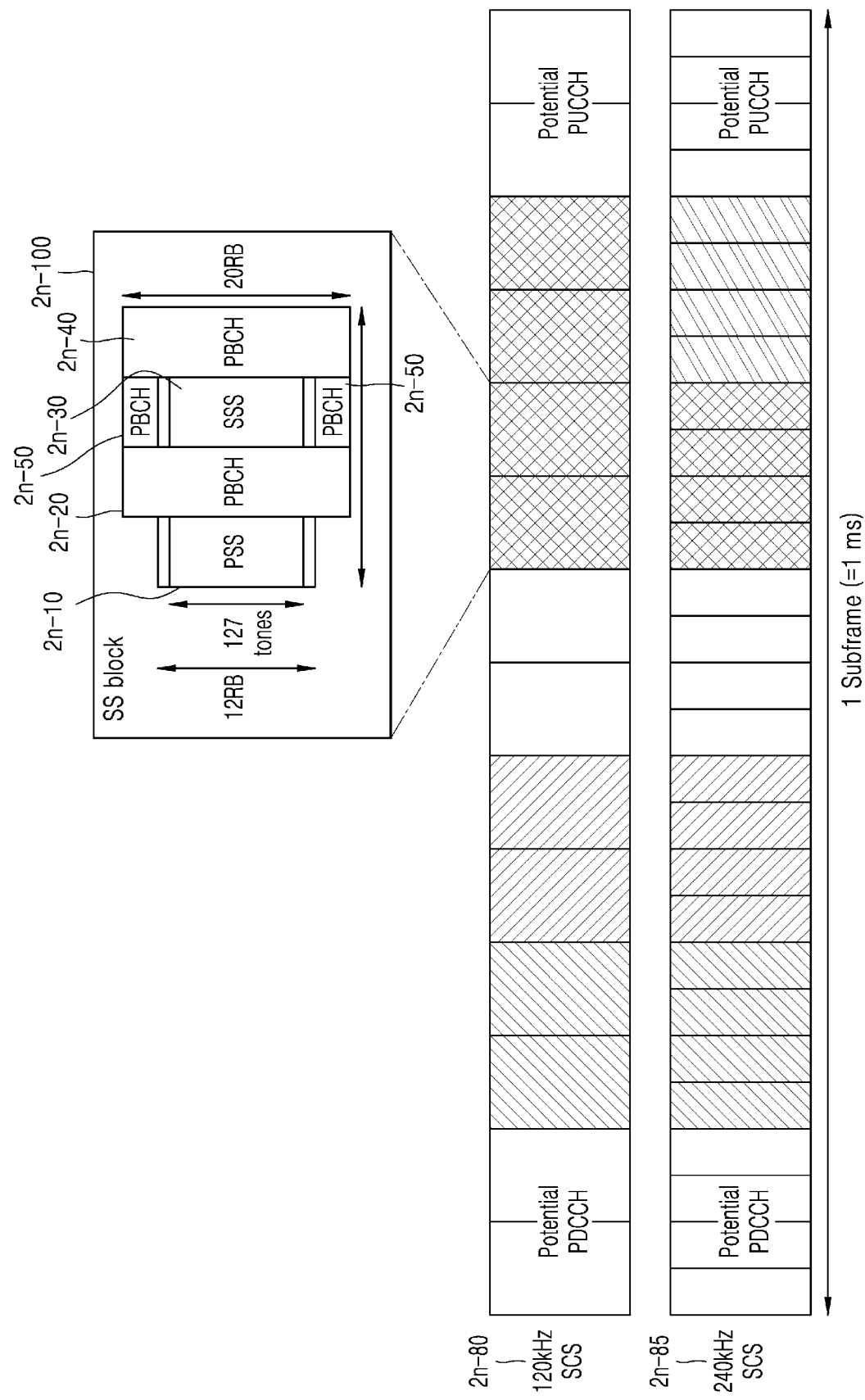
Figure 20:
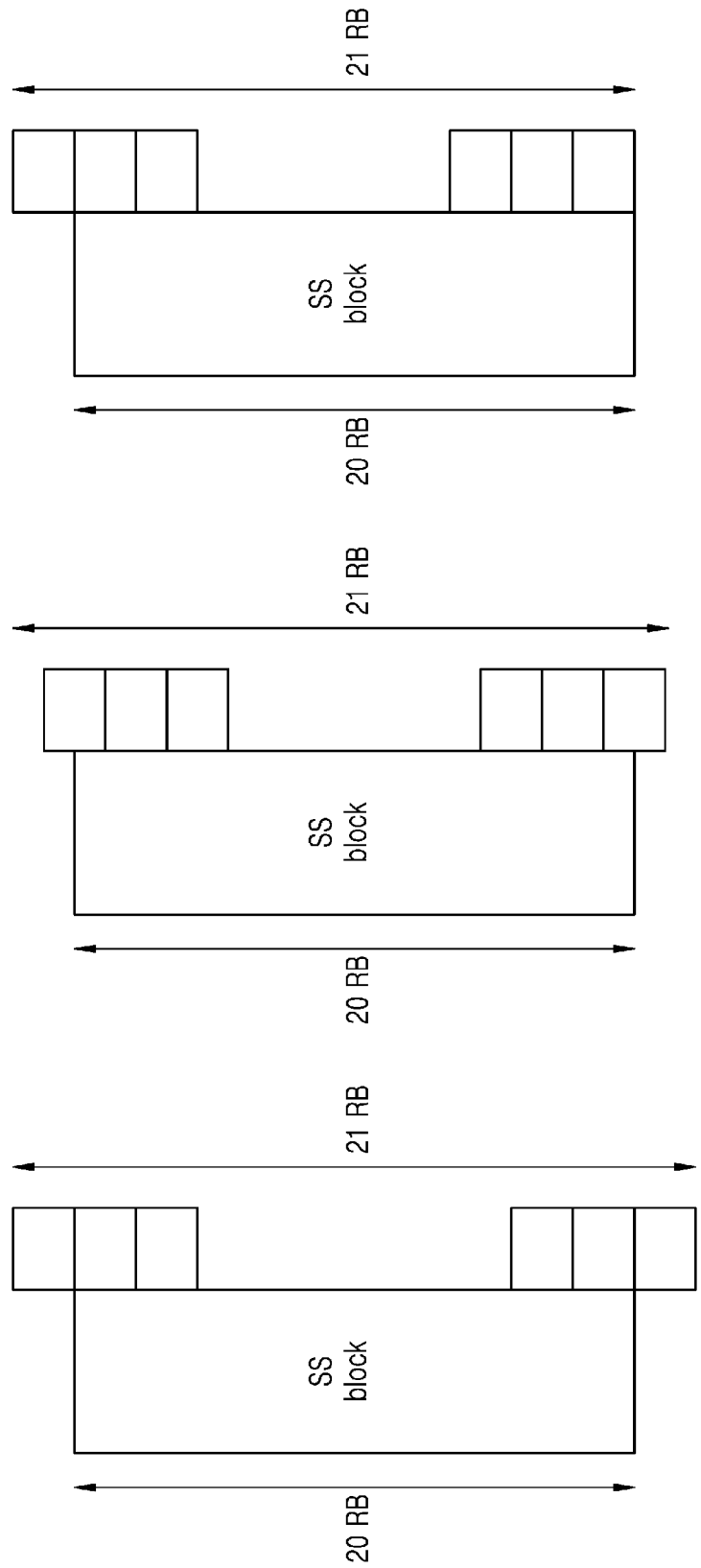

FIGS. 2M and 2N are diagrams illustrating an example of an SS/PBCH block according to an embodiment of the disclosure, and FIG. 2O is a diagram illustrating an example of a method of transmitting an SS/PBCH block.

Referring to FIG. 2M, in the 5G system defined in 3GPP, at least one SS/PBCH block 2m-100 may be included in a random frequency bandwidth (wide bandwidth component carrier (CC)). The SS/PBCH block may include not only PSS 2m-10 and SSS 2m-30 but also include PBCHs 2m-20, 2m-40, and 2m-50, and may be transmitted.

The SS/PBCH block may be transmitted with a structure as shown in FIG. 2M. The PSS 2m-10, the first PBCH 2m-20, the SSS 2m-30, and the second PBCH 2m-40 may be transmitted on different symbols, and 20 resource blocks (RBs) may be used as a frequency to transmit the SS/PBCH block 2m-100. Also, a part 2m-50 of the PBCH may be transmitted on a symbol on which the SSS 2m-30 is transmitted. Also, centers of the PSS 2m-10, the SSS 2m-30, and the PBCHs 2m-20, 2m-40, and 2m-50 may be aligned.

Referring to FIG. 2O, in the 3gpp, when a SS/PBCH block is transmitted, the SS/PBCH block may not be transmitted according to an RB grid but may be transmitted on an OFDM sub-carrier grid with offset. A value of the offset of the sub-carrier grid applied thereto may be indicated via a PBCH.

Referring back to FIG. 2M, as illustrated in 2m-70, a location of a candidate set on which the SS/PBCH block 2m-100 consisting of 4 symbols may be transmitted in two consecutive slots (14 symbols) of 120 kHz may be determined. For reference, one slot in the 3GPP may consist of 14 symbols. Alternatively, one slot may consist of 7 symbols. As illustrated in 2m-75 of FIG. 1P, a location of a candidate set on which the SS/PBCH block 2m-100 consisting of 4 symbols may be transmitted may be determined in four consecutive slots (14 symbols) of 240 kHz. In an embodiment, based on deployment in a slot illustrated in FIG. 1P, in the above 6 (240 kHZ), a total of 64 transmission candidate locations of the SS/PBCH block 2m-100 may be determined.

A transmission pattern on a time axis with respect to the SS/PBCH block 2m-100 may be repeated at regular intervals. The transmission pattern on the time axis may be determined by the 3GPP with respect to candidate locations on which the SS/PBCH block 2m-100 may be transmitted in a slot, and a maximum of 64 (above 6 Ghz, 8 for below 6, 4 for below 3) may be transmitted in initial 5 ms. A network may determine a pattern that is actually transmitted among the candidate locations. The pattern above may be repeated at intervals of 5, 10, . . . , 160 ms, and may be determined by the BS. However, in an initial access procedure, the UE may basically regard a repetition cycle of the pattern is 20 ms and may perform the initial access procedure.

Locations of a candidate set on which an SS/PBCH block 2n-100 may be transmitted in the below 6 may be as shown in FIG. 2N. As illustrated in 2n-80, in a case of 15 kHz, two locations on which the SS/PBCH block 2n-100 may be transmitted may be determined in one slot (14 symbols). Also, as illustrated in 2n-85, in a case of 30 kHz, four locations on which the SS/PBCH block 2n-100 may be transmitted may be determined in two consecutive slots (14 symbols).

A transmission pattern on a time axis with respect to the SS/PBCH block may be repeated at regular intervals. The transmission pattern on the time axis may be determined by the 3GPP with respect to candidate locations on which the SS/PBCH block 2m-100 or 2n-100 may be transmitted in a slot, and a maximum of 8 (above 6 Ghz, 8 for below 6, 4 for below 3) may be transmitted in initial 5 ms. A network may determine a pattern that is actually transmitted among the candidate locations. The pattern above may be repeated at intervals of 5, 10, . . . , 160 ms, and may be determined by the BS. However, in an initial access procedure, the UE may basically regard a repetition cycle of the pattern is 20 ms and may perform the initial access procedure.

A plurality of SS/PBCH blocks may be transmitted on a frequency axis within a frequency band operated by one BS. In this case, the network may determine a location of a frequency on which an SS/PBCH block is transmitted, and the UE may detect the location by using an interval to detect an SS/PBCH block which is defined in the standard.

In the 5G system, one or more cells may exist in a frequency band operated by one BS. At the UE's side, one cell may be associated with one SS/PBCH block. Such SS/PBCH block may be referred to as cell-associated SS/PBCH block, SS/PBCH block for defining cell, cell-defining SS/PBCH block, or the like, and is not limited to the terms. That is, in a case where DL/UL sync and RRC connection/NAS connection are completed based on an SS/PBCH block found by the UE in a frequency detecting procedure, the SS/PBCH block with respect to a cell corresponding thereto may be referred to as a cell defining SS/PBCH block.

FIG. 2P is a diagram illustrating a frame structure according to an embodiment of the disclosure.

Referring to FIG. 2P, a system frequency band (wideband CC) of a BS may include a plurality of sub operating bands (referred to as sub CCs in the disclosure). For example, sub CC1, sub CC2, sub CC3, and sub CC4 are illustrated as 4 sub operation frequency bands, but the disclosure is not limited thereto, and 3 or less sub operation frequency bands or 5 or more sub operation frequency bands may be included in an operation frequency band of the BS. The sub operation frequency band is for convenience of descriptions in the present document and may not be logically or physically identified on the actual standard or implementation.

RF capability 2p-10 that is one of UE capabilities may indicate a bandwidth (BW) a UE can support by using one RF. In FIG. 1S, a target UE that supports 3 consecutive CCs (sub CC1, sub CC2, and sub CC3) via one RF is assumed. Accordingly, an operation frequency band of the UE may be a frequency band including sub CC1, sub CC2, and sub CC3.

Also, in FIG. 2P, it may be assumed that SS/PBCH blocks exist in sub CC 1, sub CC 2, and sub CC 4. Also, the SS/PBCH block of sub CC 2 is a cell defining SS block of the target UE. In the example of FIG. 1S, the BS may indicate the UE to measure the SS/PBCH block included in sub CC1 or sub CC 4. In this case, the BS may use a method of notifying the UE of a frequency value (NR Absolute radio-frequency channel number (NR ARFCN)) of a corresponding SS/PBCH block, in a configuration message for measurement.

In FIG. 2P, physical cell identity (PCID) #1, PCID #2, and PCID #3 in respective SS/PBCH blocks existing on sub CC 1, sub CC 2, and sub CC 4 may be a same value or different values. Also, at least two PCIDs may be equal. For example, PCID #1 and PCID #2 of SS/PBCH block 1 and SS/PBCH block 2 on consecutive sub CC 1 and sub CC 2 may have a same value, and PCID #3 of SS/PBCH block 3 on sub CC 4 may have a different value.

Figure 2Q:
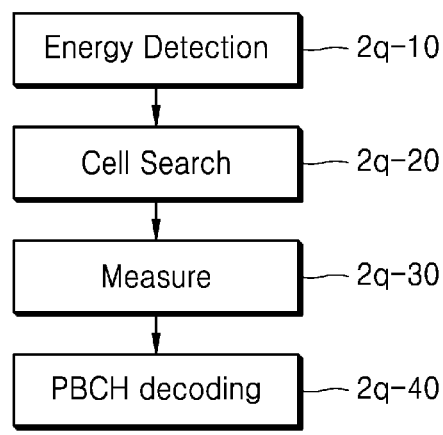
FIG. 2Q is a diagram illustrating an initial access procedure according to an embodiment of the disclosure.

FIG. 2Q is a diagram illustrating an initial access procedure according to an embodiment of the disclosure.

The initial access procedure may be performed in a procedure in which a UE initially camps on a cell when the UE is powered on. Also, it may be performed when a PLMN is changed. Alternatively, it may be performed in a procedure in which, after the UE lost a network, the UE camps on a cell again. Alternatively, it may be performed in a procedure in which, after the UE is moved in an idle state, the UE camps on a cell in a region to which the UE is moved. Alternatively, it may be performed in a procedure in which the UE in a connected state camps on a neighboring cell in response to indication from the BS or determination by the UE.

An initial access procedure of the UE will now be described with an example of a system assumed with reference to FIG. 2P. One possible scenario from among various possibilities will now be described, but the disclosure is not limited thereto.

Referring to FIG. 2Q, in operation 2q-10, the UE may perform energy detection and may search an SS/PBCH block. The UE may search an SS/PBCH block in a carrier frequency band by using synchronization signal (SS) raster information. Here, the SS raster information may be indication indicating a location on which a synchronization signal can be detected, and may include a global synchronization channel number (GSCN) or an NR ARFCN. Accordingly, in the scenario of FIG. 2I, the UE may detect PSS and SSS of sub CC 2.

In an embodiment, the UE may detect a plurality of SS/PBCH blocks included in a band, based on a sequence of the PSS, and may select one SS/PBCH block from among the detected plurality of SS/PBCH blocks. The UE may use information of the detected plurality of SS/PBCH blocks in a measurement operation.

In an embodiment, the UE may select an SS/PBCH block of which correlation peak value is highest. Alternatively, the UE may select an SS/PBCH block of which signal to noise ratio (SNR)/received signal strength indicator (RSSI) is largest.

When SS/PBCH blocks are transmitted via multiple beams, the UE may select one of SS/PBCH blocks received via Rx beam of the UE.

In operation 2q-20, the UE may perform cell searching. The UE may identify whether there is a cell mapped to the PSS or the SSS detected in operation 2q-10, by using known PSS and SSS sequences. By doing so, the UE may detect a PCID of the corresponding cell. Also, at the same time or earlier than or later than the procedure is performed, the UE may perform a process of synchronizing DL sync.

In operation 2q-30, the UE may perform measurement. The UE may calculate or measure quality based on reference signal received power (RSRP) of PBCH DMRS identified based on RSRP and determined PCID of a selected SS/PBCH block. This procedure may be performed earlier than operation 2q-20 or may be simultaneously performed with operation 2q-20 or may be performed later than operation 2q-20.

In operation 2q-40, the UE may perform PBCH decoding on the PSS/SSS in the SS/PBCH block detected in operation 2q-20. According to the scenario of FIG. 1S, the UE may perform PBCH decoding on PSS/SSS in an SS/PBCH block of sub CC 2.

The UE may obtain control resource set (CORESET) information related to remaining minimum system information (RMSI) in a PBCH. The UE may obtain RMSI data by decoding a CORESET related to the RMSI, based on the obtained information. Then, the UE may obtain random access channel (RACH) configuration information in the RMSI. The UE may perform a RACH procedure based on the RACH configuration information found in the RMSI. When the UE receives an RRC configuration message via MSG 4 in the RACH procedure, an RRC state of the UE may be transitioned to an RRC_CONNECTED state.

Then, the UE may identify a temporal location of an SS/PBCH block actually transmitted from a network, which is included in the RRC reconfiguration message.

The UE having transitioned to the RRC_CONNECTED state may transmit UE capability information. The UE capability may include information of a bandwidth and information of a band in which the UE can operate. Also, the UE capability may include a time period required for the UE to process received data. In more detail, time information required for the UE to process scheduling information received for UL data and to transmit the UL data based on the information may be included. Also, the UE capability may include a time period for the UE to process received DL data and to transmit ACK/NACK of the DL data based on the processing result. Also, the UE capability may include combination information of bands available for carrier aggregation by the UE. Afterward, an operating bandwidth of the UE may be configured as an operating bandwidth matching UE RF capability, via an RRC reconfiguration message. For example, describing with reference to the scenario of FIG. 1S, sub CC 1-sub CC 3 may be configured as the operating bandwidth of the UE.

Then, one or more BWPs (at least one BWP is configured within a band including sub CC 1-sub CC 3 of the scenario of FIG. 1S) are configured via the RRC reconfiguration message, and the UE may receive, in the RRC reconfiguration message, information related to neighboring cells on which measurement is to be performed, e.g., at least one of frequency and time information related to an SS/PBCH block and a CSI-RS.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium or the computer program product are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, configuration elements included in the disclosure are expressed in a singular or plural form according to the embodiments of the disclosure. However, the singular or plural form is appropriately selected for convenience of explanation and the disclosure is not limited thereto. As such, a configuration element expressed in a plural form may also be configured as a single element, and a configuration element expressed in a singular form may also be configured as plural elements.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, the BS and the UE may be operated in a manner that portions of an embodiment of the disclosure are combined with portions of another embodiment of the disclosure. Also, modifications based on the technical scope of the embodiments of the disclosure may be applied to various systems such as a FDD LTE system, a TDD LTE system, a 5G or NR system, or the like.

The invention claimed is:

1. A method performed by a terminal, the method comprising:
    receiving a system information block (SIB) from a base station;
    in case that the received SIB is a SIB4, obtaining, from the SIB4, first synchronization signal/physical broadcast channel block measurement timing configuration (SMTC) information for a frequency different from a serving cell frequency, wherein the first SMTC information includes a parameter indicating a first periodicity;
    in case that second SMTC information for the frequency is included in the SIB4, identifying time configuration for a synchronization signal/physical broadcast channel (SS/PBCH) block measurement, based on a second periodicity identified from the second SMTC information and a timing offset and a duration identified from the first SMTC information for the frequency; and performing the SS/PBCH block measurement for an inter-frequency cell indicated by a physical cell ID (PCI) list included in the second SMTC information, based on the identified time configuration,
wherein the PCI list indicates the inter-frequency cell with the second periodicity longer than the first periodicity.

2. The method of claim 1, wherein a parameter indicating the second periodicity is configured to have a value larger than a value of the parameter indicating the first periodicity.

3. The method of claim 1, wherein in case that the received SIB is a SIB2, second SMTC information for a frequency same with the serving cell frequency includes a PCI list regarding an intra-frequency cell, and
the method further comprising:
performing a SS/PBCH block measurement for the intra-frequency cell.

4. A method performed by a base station, the method comprising:
transmitting, to a terminal, a system information block 4 (SIB4) including first synchronization signal/physical broadcast channel block measurement timing configuration (SMTC) information and second SMTC information for a frequency different from a serving cell frequency,
wherein the first SMTC information includes a parameter indicating a first periodicity,
wherein time configuration for a synchronization signal/physical broadcast channel (SS/PBCH) block measurement is identified at the terminal based on a second periodicity identified from the second SMTC information and a timing offset and a duration identified from the first SMTC information,
wherein the SS/PBCH block measurement for an inter-frequency cell indicated by a physical cell ID (PCI) list included in the second SMTC information is performed at the terminal, based on the identified time configuration, and
wherein the PCI list indicates the inter-frequency cell with the second periodicity longer than the first periodicity.

5. The method of claim 4, wherein in case that the SIB is a SIB2 is transmitted to the terminal, second SMTC information for a frequency same with the serving cell frequency includes a PCI list regarding an intra-frequency cell, and
a SS/PBCH block measurement for the intra-frequency cell is performed at the terminal.

6. A terminal comprising:
a transceiver; and
a processor coupled with the transceiver and configured to:
receive a system information block (SIB) from a base station,
in case that the received SIB is a SIB4, obtain, from the SIB4, first synchronization signal/physical broadcast channel block measurement timing configuration (SMTC) information for a frequency different from a serving cell frequency, wherein the first SMTC information includes a parameter indicating a first periodicity,
in case that second SMTC information for the frequency is included in the SIB4, identify time configuration for a synchronization signal/physical broadcast channel (SS/PBCH) block measurement, based on a second periodicity identified from the second SMTC information and a timing offset and a duration identified from the first SMTC information for the frequency, and
perform the SS/PBCH block measurement for an inter-frequency cell indicated by a physical cell ID (PCI) list included in the second SMTC information, based on the identified time configuration,
wherein the PCI list indicates the inter-frequency cell with the second periodicity longer than the first periodicity.

7. The terminal of claim 6, wherein a parameter indicating the second periodicity is configured to have a value larger than a value of the parameter indicating the first periodicity.

8. The terminal of claim 6, wherein in case that the received SIB is a SIB2, second SMTC information for a frequency same with the serving cell frequency includes a PCI list regarding an intra-frequency cells, and
the processor is configured to perform a SS/PBCH block measurement for the intra-frequency cell.

9. A base station comprising:
a transceiver; and
a processor coupled with the transceiver and configured to:
transmit to a terminal, a system information block 4 (SIB4) including first synchronization signal/physical broadcast channel block measurement timing configuration (SMTC) information and second SMTC information for a frequency different from a serving cell frequency,
wherein the first SMTC information includes a parameter indicating a first periodicity,
wherein time configuration for a synchronization signal/physical broadcast channel (SS/PBCH) block measurement is identified at the terminal, based on a second periodicity identified from the second SMTC information and a timing offset and a duration identified from the first SMTC information,
wherein the SS/PBCH block measurement for an inter-frequency cell indicated by a physical cell ID (PCI) list included in the second SMTC information is performed at the terminal, based on the identified time configuration, and
wherein the PCI list indicates the inter-frequency cell with the second periodicity longer than the first periodicity.

10. The base station of claim 9, wherein a parameter indicating the second periodicity is configured to have a value larger than a value of the parameter indicating the first periodicity.

11. The base station of claim 9, wherein in case that a SIB2 is transmitted to the terminal, second SMTC information for a frequency same with the serving cell frequency includes a PCI list regarding an intra-frequency cell, and
a SS/PBCH block measurement for the intra-frequency cell is performed at the terminal.

* * * * *